United States Patent
Kaushik et al.

(10) Patent No.: US 10,324,873 B2
(45) Date of Patent: Jun. 18, 2019

(54) HARDWARE ACCELERATED COMMUNICATIONS OVER A CHIP-TO-CHIP INTERFACE

(71) Applicant: Qualcomm Innovation Center, Inc., San Diego, CA (US)

(72) Inventors: Vinod H. Kaushik, San Diego, CA (US); Igor Malamant, San Diego, CA (US); Sergio Kolor, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 15/454,441

(22) Filed: Mar. 9, 2017

(65) Prior Publication Data

US 2017/0185545 A1    Jun. 29, 2017

Related U.S. Application Data

(63) Continuation of application No. 14/163,846, filed on Jan. 24, 2014, now Pat. No. 9,594,718.

(60) Provisional application No. 61/756,093, filed on Jan. 24, 2013.

(51) Int. Cl.
| | |
|---|---|
| *G06F 13/24* | (2006.01) |
| *G06F 13/42* | (2006.01) |
| *G06F 12/02* | (2006.01) |
| *G06F 13/28* | (2006.01) |
| *H04B 7/26* | (2006.01) |

(52) U.S. Cl.
CPC ............ *G06F 13/24* (2013.01); *G06F 12/023* (2013.01); *G06F 13/28* (2013.01); *G06F 13/4269* (2013.01); *G06F 13/4282* (2013.01); *H04B 7/2603* (2013.01); *G06F 2212/1044* (2013.01); *Y02D 10/14* (2018.01); *Y02D 10/151* (2018.01)

(58) Field of Classification Search
CPC combination set(s) only.
See application file for complete search history.

(56) References Cited

U.S. PATENT DOCUMENTS

| | | | |
|---|---|---|---|
| 6,161,201 A | 12/2000 | Payne et al. | |
| 7,281,066 B2 | 10/2007 | Rader et al. | |
| 7,631,128 B1 | 12/2009 | Sgrosso et al. | |
| 7,865,744 B2 | 1/2011 | Lee et al. | |

(Continued)

FOREIGN PATENT DOCUMENTS

WO    2012023151 A2    2/2012

*Primary Examiner* — Henry Tsai
*Assistant Examiner* — Juanito Borromeo
(74) *Attorney, Agent, or Firm* — Neugeboren ODowd PC/Qualcomm

(57) ABSTRACT

A device and method for communicating, via a memory-mapped communication path, between a host processor and a cellular-communication modem are disclosed. The method includes providing logical channels over the memory-mapped communication path and transporting data organized according to one or more cellular communication protocols over at least one of the logical channels. In addition, the method includes acknowledging when data transfer occurs between the host processor and the cellular-communication modem, issuing commands between the host processor and the cellular-communication modem, and communicating and managing a power state via one or more of the logical channels.

17 Claims, 22 Drawing Sheets

(56) References Cited

U.S. PATENT DOCUMENTS

| | | |
|---|---|---|
| 7,904,606 B2 | 3/2011 | Casper et al. |
| 8,103,803 B2 | 1/2012 | Reddy et al. |
| 8,200,910 B2 | 6/2012 | Arimilli et al. |
| 8,437,343 B1 | 5/2013 | Wagh et al. |
| 2005/0251672 A1* | 11/2005 | Kim .................... G06F 11/1417 713/1 |
| 2007/0239944 A1* | 10/2007 | Rupanagunta ........ G06F 3/0613 711/147 |
| 2010/0153590 A1 | 6/2010 | Hsin et al. |
| 2011/0208892 A1 | 8/2011 | Meyers |
| 2011/0261796 A1* | 10/2011 | Moeller ................ H04M 11/06 370/338 |
| 2012/0072710 A1 | 3/2012 | Gupta et al. |
| 2012/0089814 A1 | 4/2012 | Gupta et al. |
| 2012/0210093 A1 | 8/2012 | Urzi et al. |
| 2012/0265916 A1 | 10/2012 | Nordstrom et al. |
| 2013/0198538 A1 | 8/2013 | Diab et al. |
| 2014/0207991 A1 | 7/2014 | Kaushik et al. |

* cited by examiner

US 10,324,873 B2

HARDWARE ACCELERATED COMMUNICATIONS OVER A CHIP-TO-CHIP INTERFACE

CLAIM PRIORITY UNDER 35 U.S.C. § 120

The present Application for Patent is a Continuation of patent application Ser. No. 14/163,846 entitled "HARDWARE ACCELERATED COMMUNICATIONS OVER A CHIP-TO-CHIP INTERFACE" filed Jan. 24, 2014, pending, which claims priority to Provisional Application No. 61/756,093 entitled "HARDWARE ACCELERATED COMMUNICATIONS OVER A CHIP-TO-CHIP INTERFACE" filed Jan. 24, 2013, and assigned to the assignee hereof and hereby expressly incorporated by reference herein.

BACKGROUND

Field

Various features relate to facilitating accelerated communication and transfer of data between chips or processors.

Background

Many electronic devices include multiple processors that perform distinct functions during operation. However, during startup or boot-up of the electronic device, these processors must load instructions (e.g., boot images or software images) to operate. In certain implementations, support or auxiliary chips (e.g., processors) obtain such instructions or software from another chip, like an application processor, through a chip-to-chip interface.

Some devices (e.g., PCIe capable devices) with an application processor ("AP") that require an executable software image can store their software images onboard in either a boot ROM chip or in persistent file storage mechanism (e.g., NAND/NOR flash). Both these alternatives are cost and time inefficient.

Another alternate scheme includes a device driver on the application processor that memory maps the device RAM and copies the software images directly into device RAM. This approach requires involvement of the application processor and results in sub-optimal application processor throughput. Thus, current chip-to-chip data transfer approaches are costly, time intensive, and/or suboptimal.

SUMMARY

According to one aspect the invention may be characterized as a method for communicating, via a memory-mapped communication path, between a host processor and a cellular-communication modem. The method includes providing logical channels over the memory-mapped communication path and transporting data organized according to one or more cellular communication protocols over at least one of the logical channels. In addition, the method includes acknowledging when data transfer occurs between the host processor and the cellular-communication modem, issuing commands between the host processor and the cellular-communication modem, and communicating and managing a power state via one or more of the logical channels.

According to another aspect, the invention may be characterized as a computing apparatus that includes a host processor, a cellular communication modem, and a memory-mapped communication path disposed between the host processor and the cellular-communication modem. The apparatus also includes means for providing logical channels over the memory-mapped communication path, means for transporting data organized according to one or more cellular communication protocols over at least one of the logical channels, means for acknowledging when data transfer occurs between the host processor and the cellular-communication modem, means for issuing commands between the host processor and the cellular-communication modem, and means for communicating and managing a power state via one or more of the logical channels.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Figure 1:
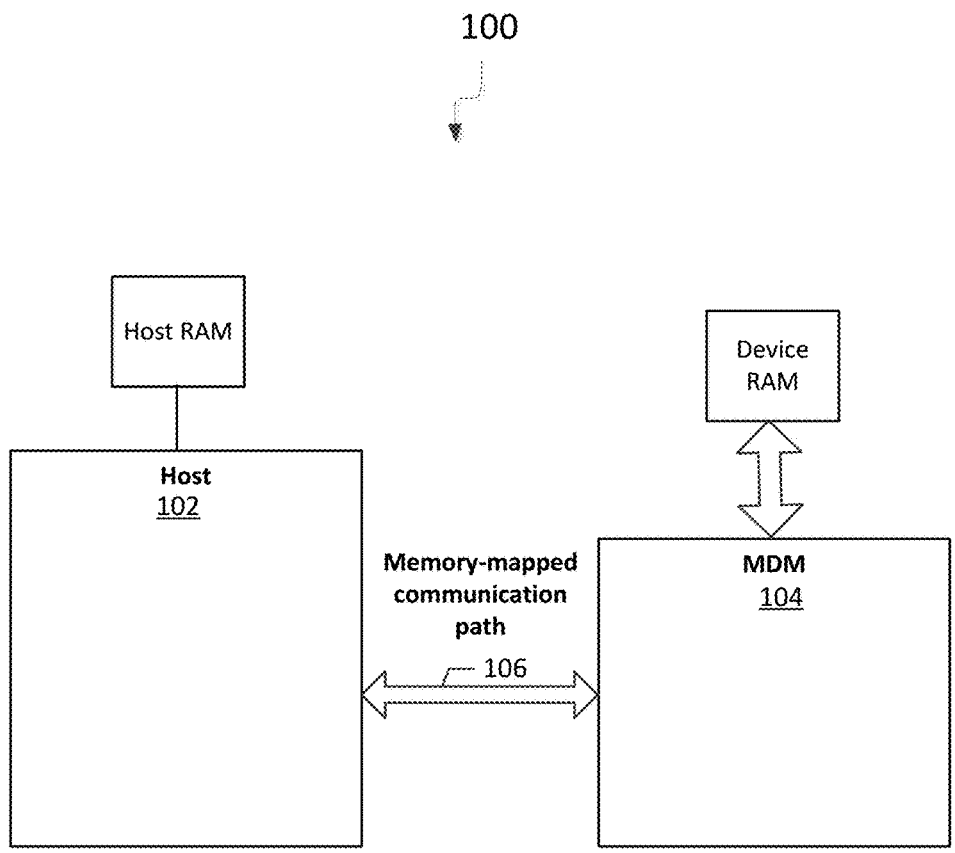
FIG. 1 is a block diagram depicting a computing device that may be utilized in connection with several embodiments.

Referring to FIG. 1, it is a block diagram illustrating, at a high level, the general architecture for a computing device 100 that uses a memory-mapped communication path 106 between a host processor 102 and a cellular-communication modem (MDM) 104. Although not depicted for clarity, one of ordinary skill in the art will appreciate that the cellular-communication modem 104 may be coupled to a cellular transceiver and associated components for receiving cellular voice and data communications (e.g., 2G, 3G, and long term evolution (LTE) communications). As discussed further herein, several embodiments enable communications (e.g., commands and diagnostics) and data transfer between the host processor 102 and the MDM 104 via the memory-mapped communication path (MMCP) 106. Several novel features disclosed herein pertain to improvements to utilization of the memory-mapped communication path 106. For example, a novel protocol that establishes logical communication channels over the memory-mapped communication path 106 is disclosed herein in connection with different use-cases that leverage the functionality of the protocol. In various modes of operation, one or more of cellular data, diagnostic information, commands, and modem file system information may be provided via one or more of the logical channels of the memory-mapped communication path 106.

The computing device 100 may be realized by a variety of different types of computing systems including tablets, netbooks, smartphones, Ultrabooks, etc. The memory-mapped communication path 106 may be realized by memory-mapped paths such as random access memory and peripheral component interconnect express (PCIe).

For ease of description, in several embodiments described herein, the host processor 102 is realized by an application processor (AP), and the memory-mapped communication path 106 is realized by a PCIe link. But those of ordinary skill in the art, in view of this specification, will recognized that devices other than application processors and modems may be utilized is some embodiments, and that the memory-mapped communication path 106 may be realized by communication links other than peripheral component interconnect express.

As a particular use-case example, the flashless boot of a modem via a PCIe-connected host processor is detailed herein. As discussed further herein, application processor (AP) software complexity may be reduced and CPU/DMA processing may be offloaded to PCIe end point (PCIe EP) software that controls image download and memory dump upload from/to AP RAM. In one example, this feature may apply to a smartphone device with a separate AP chip and cellular modem/baseband processor chip connected using PCIe bus as an interchip communication mechanism. The cellular modem processor may lack persistent storage to store its software images, and as a consequence, the cellular modem software images may be downloaded from AP RAM over the PCIe link or interface. This feature may also minimize AP involvement by offloading data transfer management to the PCIe EP in the cellular modem processor thus permitting a CPU of the AP to execute other tasks.

Figure 2:
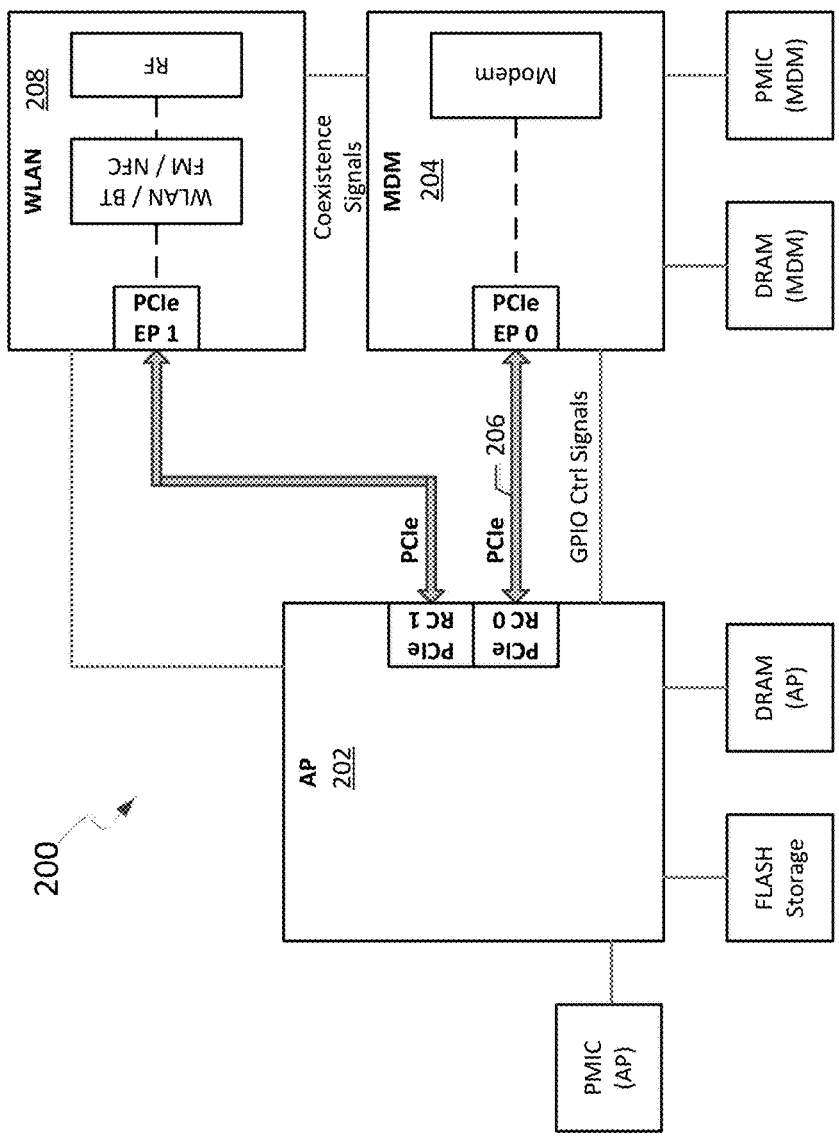
FIG. 2 is a block diagram depicting a topology of a computing device that may be utilized in connection with several embodiments.

Referring next to FIG. 2, shown is a topology in which the host processor 102 is an application processor 202. As shown in FIG. 2, the application processor 202 includes two PCIe root complexes servicing two independent PCIe interfaces: one for the cellular communication modem (MDM) 204 and a second for a WLAN chip 208.

Figure 3:
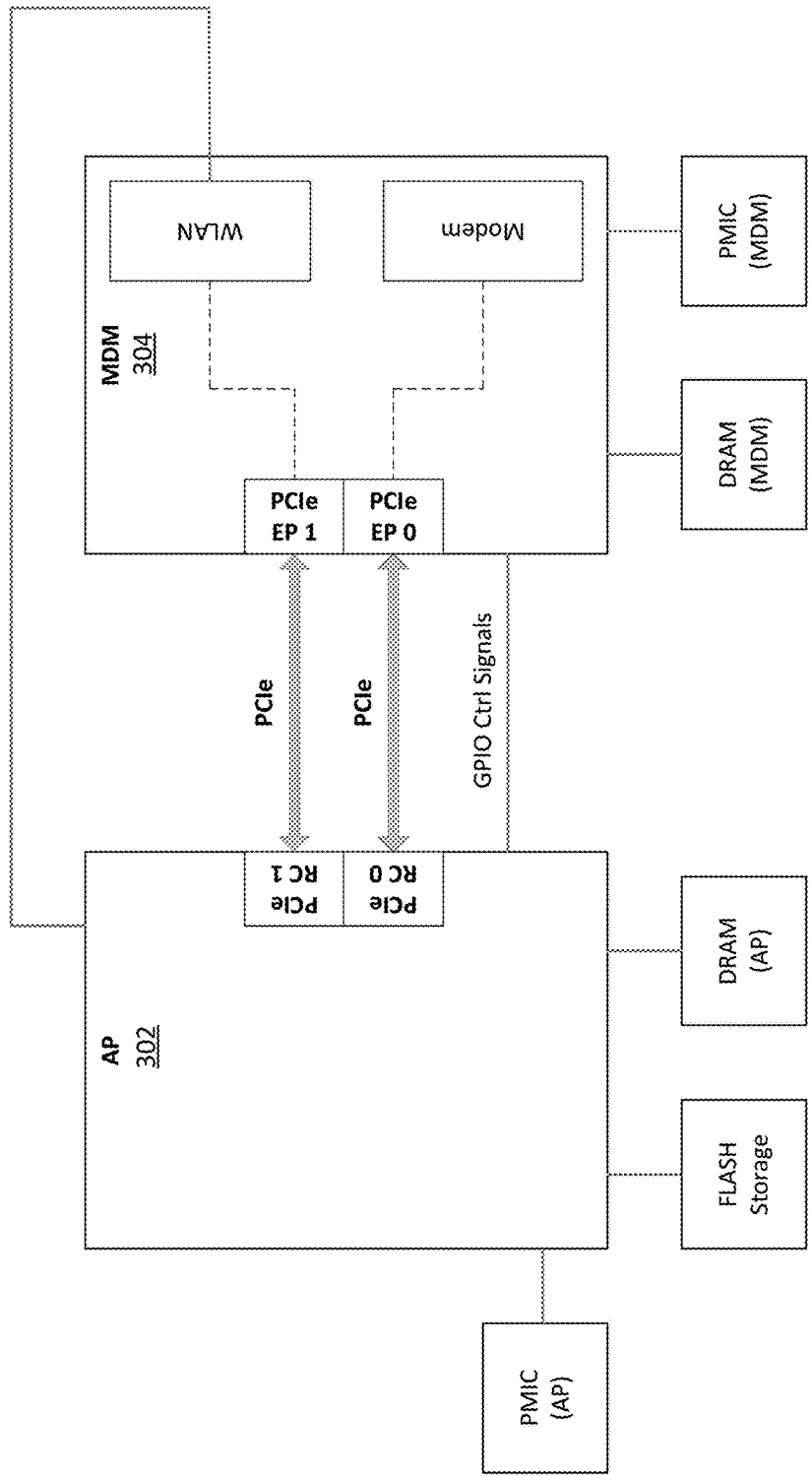
FIG. 3 is a block diagram depicting another topology of that may be utilized in connection with other embodiments.
Figure 4:
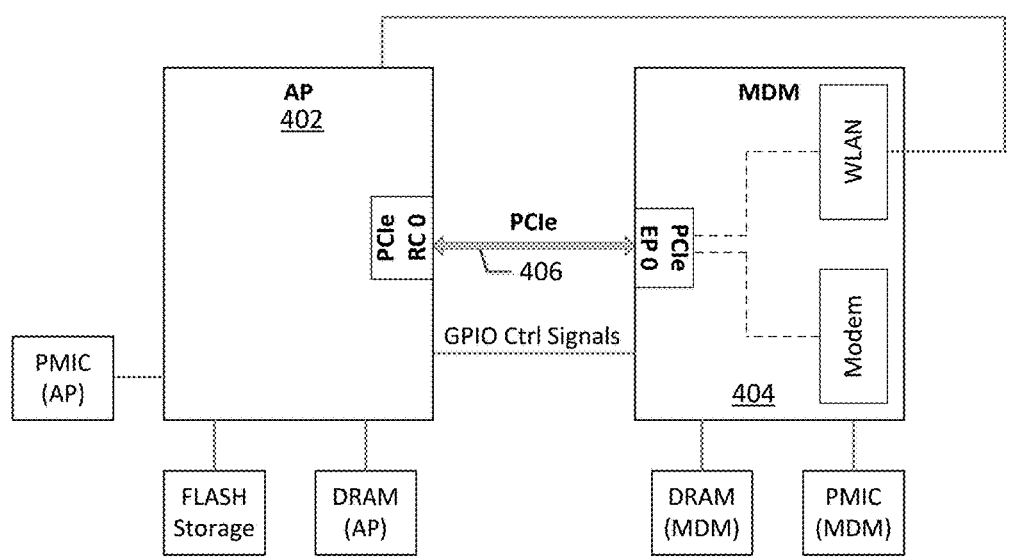
FIG. 4 is a block diagram depicting yet another topology that may be utilized in connection with yet other embodiments.

The cellular communication modem 204 and WLAN chip 208 can be discrete or integrated into a single chip. In the integrated solution, two independent PCIe links can still be used for the cellular communication modem (MDM) 204 and WLAN chip 208 accordingly, or a single multi-function PCIe link can be shared by both modems. FIG. 3 illustrates a system topology diagram with two independent PCIe links between an application processor 302 and an integrated MDM 304 that includes cellular modem and WLAN components. And FIG. 4 illustrates a system topology diagram with a single multi-function PCIe link 406 that couples an application processor 402 with an integrated MDM 404 that includes cellular modem and WLAN components.

Figure 5:
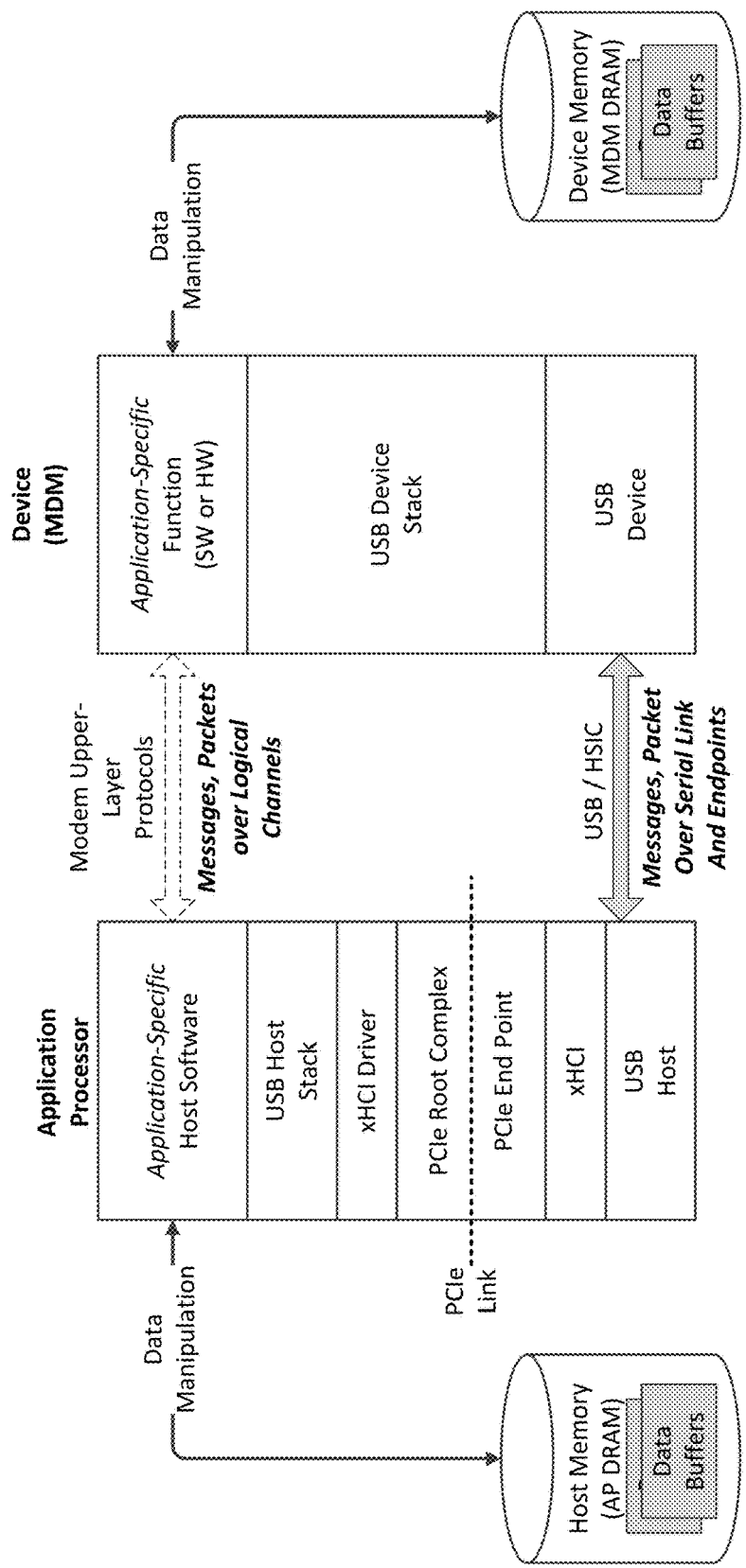
FIG. 5 is a block diagram illustrating the relative level of a PCIe interface within the protocol stack of FIG. 4.

FIG. 5 is a block diagram illustrating a computing device that uses a universal serial bus (USB) interface between an application processor (AP) and an MDM to transfer a boot image from the AP to the MDM. Here, the AP may load the boot image from its AP RAM and transfer it to the MDM which may store it in its device memory for execution. The boot image transfer between the AP and modem may be performed between a USB host (at the AP) and a USB Device which provide a low level transport mechanism on which higher level software may effectuate the boot image transfer using the device's upper-layer protocols. Also shown are a controller interface (HCI) layer within the AP stack for the universal serial bus (USB) interface.

PCIe devices with a CPU that require an executable software image can store their software images onboard in either a boot ROM chip or in persistent file storage mechanism (e.g., NAND/NOR flash). Both these alternatives are cost and time inefficient.

Another alternate scheme would be to have the device driver on the Application processor (AP) memory map the device RAM and copy the software images directly into device RAM. This approach requires application processor involvement and results in sub-optimal AP CPU throughput.

FIG. 5 also depicts the relative level of a PCIe interface within the protocol stack. As can be appreciated here, PCIe does not provide all of the low-level support provided by USB. However, one advantage of PCIe is that it can provide faster throughput than USB and is scalable as the system architecture expands. Consequently, in certain circumstances, it may be desirable to implement a PCIe interface between the host processor 102 and MDM 104 while avoiding the USB interface.

Figure 6:
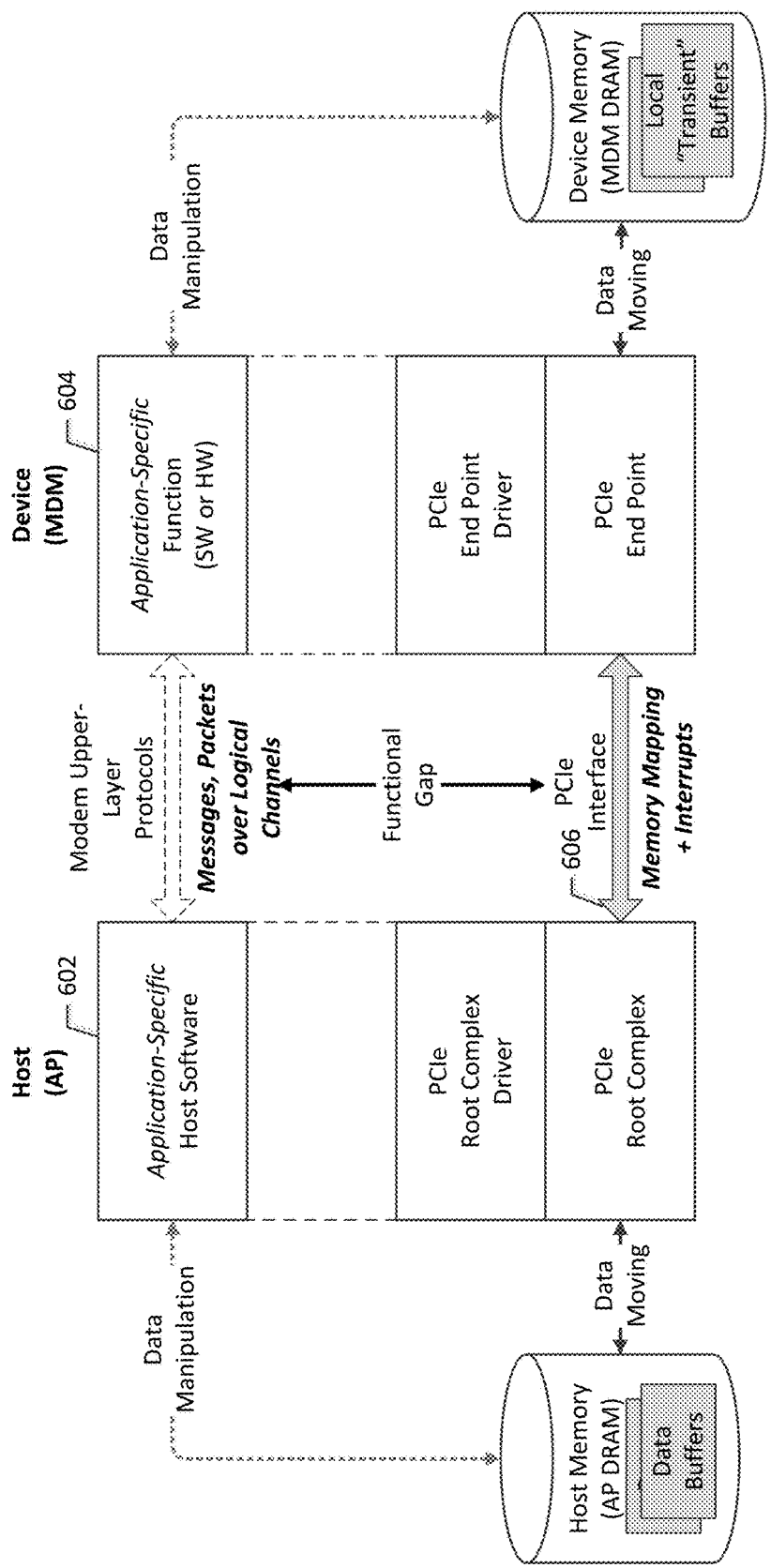
FIG. 6 is a block diagram illustrating a functional gap in the protocol stack of FIG. 5.

FIG. 6 is a block diagram illustrating a computing device that uses a PCIe interface 606 as a memory-mapped communication path between a host processor 602 and an MDM 604. As shown, there is a functional gap between the low-level PCIe interface 606 and upper layer protocols. For example, the standard PCIe interface 606 fails to provide sufficient support to implement data transfer from the host processor 602 to the MDM 604 without significant involvement from a processor of the host processor 602.

Figure 7:
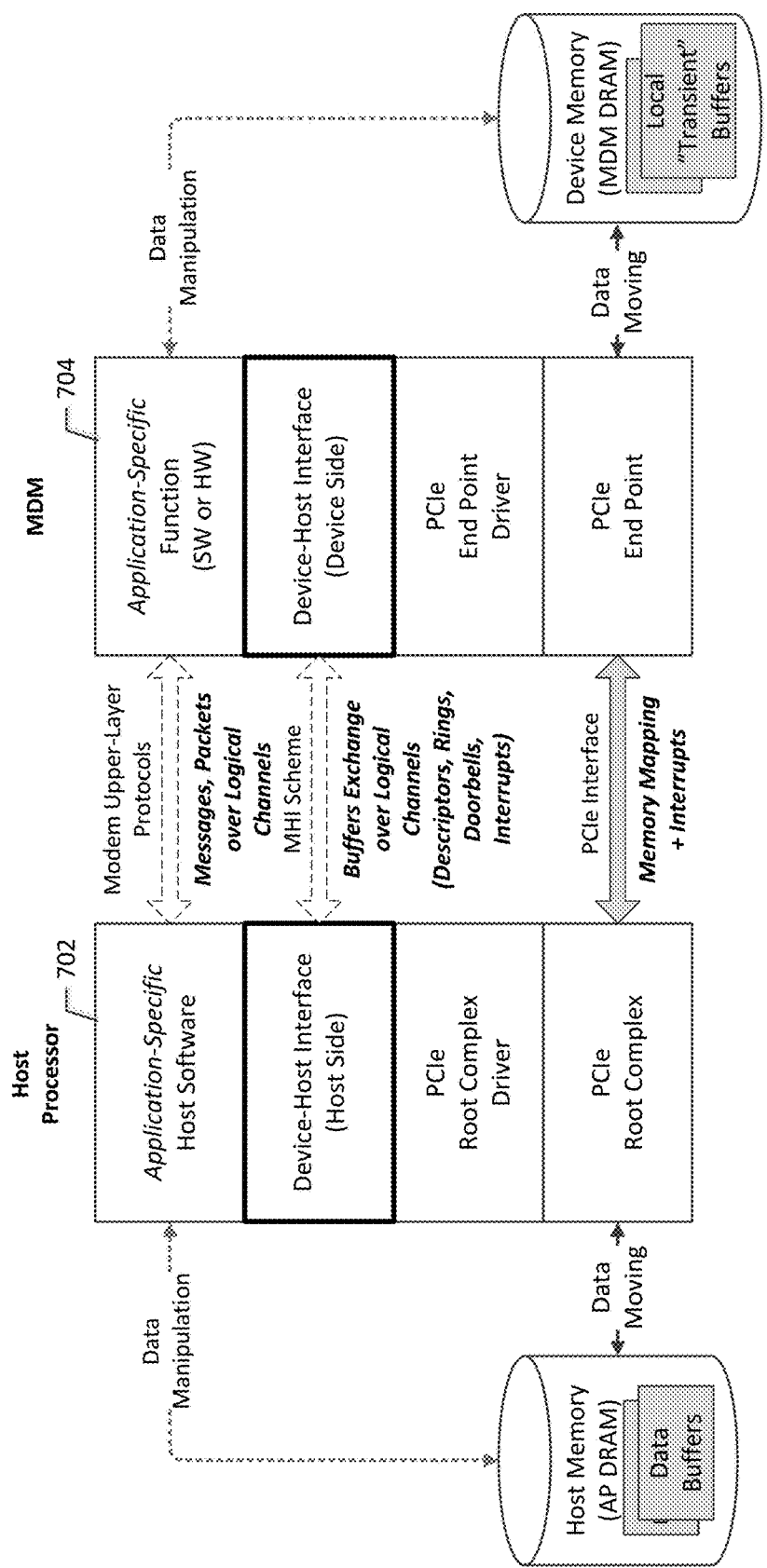
FIG. 7 is a block diagram illustrating a modem-host interface implemented within the functional gap in FIG. 6.
Figure 8:
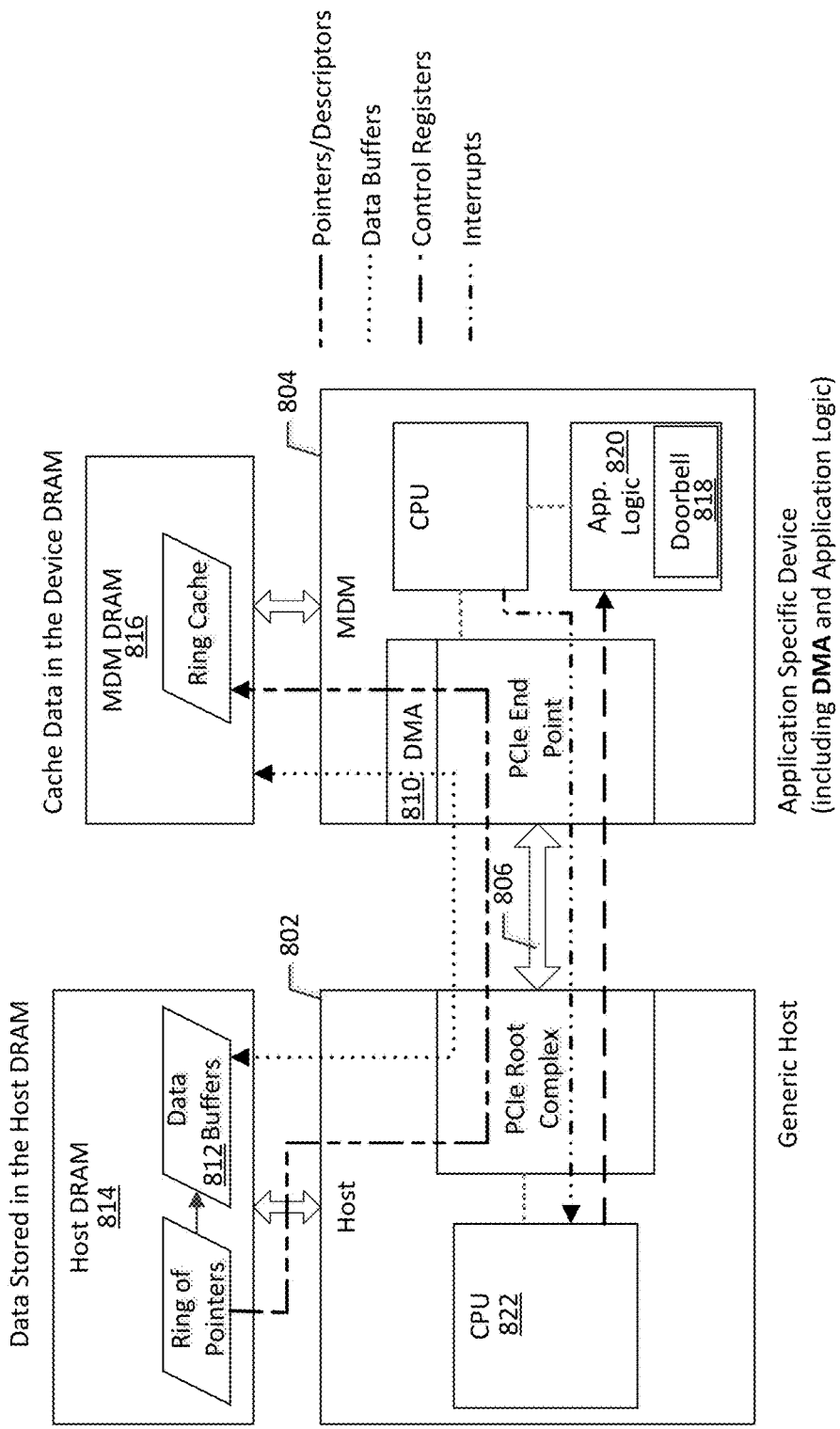
FIG. 8 is a block diagram illustrating a PCIe system that may be utilized in several embodiments.

Referring next to FIG. 7, shown is a novel protocol stack that may be utilized with the topologies described with reference to FIGS. 2-4, which implements a modem-host interface (MHI) that fills the functional gap described with reference to FIG. 6. While referring to FIG. 7, simultaneous reference is made to FIG. 8, which depicts a computing device (e.g., a cellular-enabled communication device) for reference. In general, the modem-host interface provides logical channels over a memory-mapped communication path such as a PCIe link. The logical channels enable transport of upper layer cellular modem communication protocols (e.g., 2G, 3G, and LTE protocols) from the MDM 704 to the host processor 702. Moreover, commands may be issued between the host processor 702 and the cellular-communication modem (MDM) 704 and a power state may also be communicated and managed via one or more of the logical channels. In addition, the modem-host interface functions to offload the task of downloading software executable images to a PCIe device. The PCIe device accomplishes software image download via hardware-accelerated mechanism (e.g., an enhanced direct memory access (DMA) Engine 810) using data buffers 812 allocated in the host RAM 814. That is, a shared memory space is used to transfer the boot image between the host processor 802 and MDM 804.

As discussed further herein, a communication link (e.g., PCIe) device driver enumerates the MDM 804, and allocates direct memory access data buffers 812 in the host RAM 814. As discussed further herein, the location (address) of the DMA buffer list is communicated to the MDM 804 via memory mapped configuration registers. As depicted, a doorbell 818 located in application logic 820 of the MDM 804 is used by the host processor 802 to trigger the processing of new transactions by the MDM 804. Upon completion, the MDM 804 triggers an interrupt (e.g., PCIe interrupt) towards the host CPU 822 for further processing.

Upon reset/power-up, the MDM 804 executes its primary boot loader (PBL) from the hardware boot ROM (small read-only on-chip memory). The PBL then downloads executable code from the host RAM 814 into the MDM RAM 816 over a memory-mapped communication path 806 (e.g., PCIe) via a hardware accelerated DMA mechanism using the data buffers 812 programmed by the host processor 802 in the configuration registers. The DMA engine 810 communicates read/write completion via events/interrupts back to the host processor 802 CPU. DMA buffer recycling may be handled by the host processor 802 upon receipt of the read/write completion events. Once the MDM 804 executable image is downloaded into the MDM RAM 816 and authenticated, the MDM boot ROM code jumps into that image and starts executing the main MDM boot program from RAM. Similarly for RAM dumps, the MDM 804 uploads RAM dump regions from MDM RAM 816 into the host RAM 814 using a similar hardware accelerated mechanism. In one exemplary implementation, the modem-host protocol (flashless boot over high-speed interchip (HSIC)) may be implemented using the proposed hardware accelerated mechanism as a transport medium. In the case where the MDM 804 is realized by a modem chip, the application logic 820 may be a modem subsystem or a packet processing component.

Figure 9:
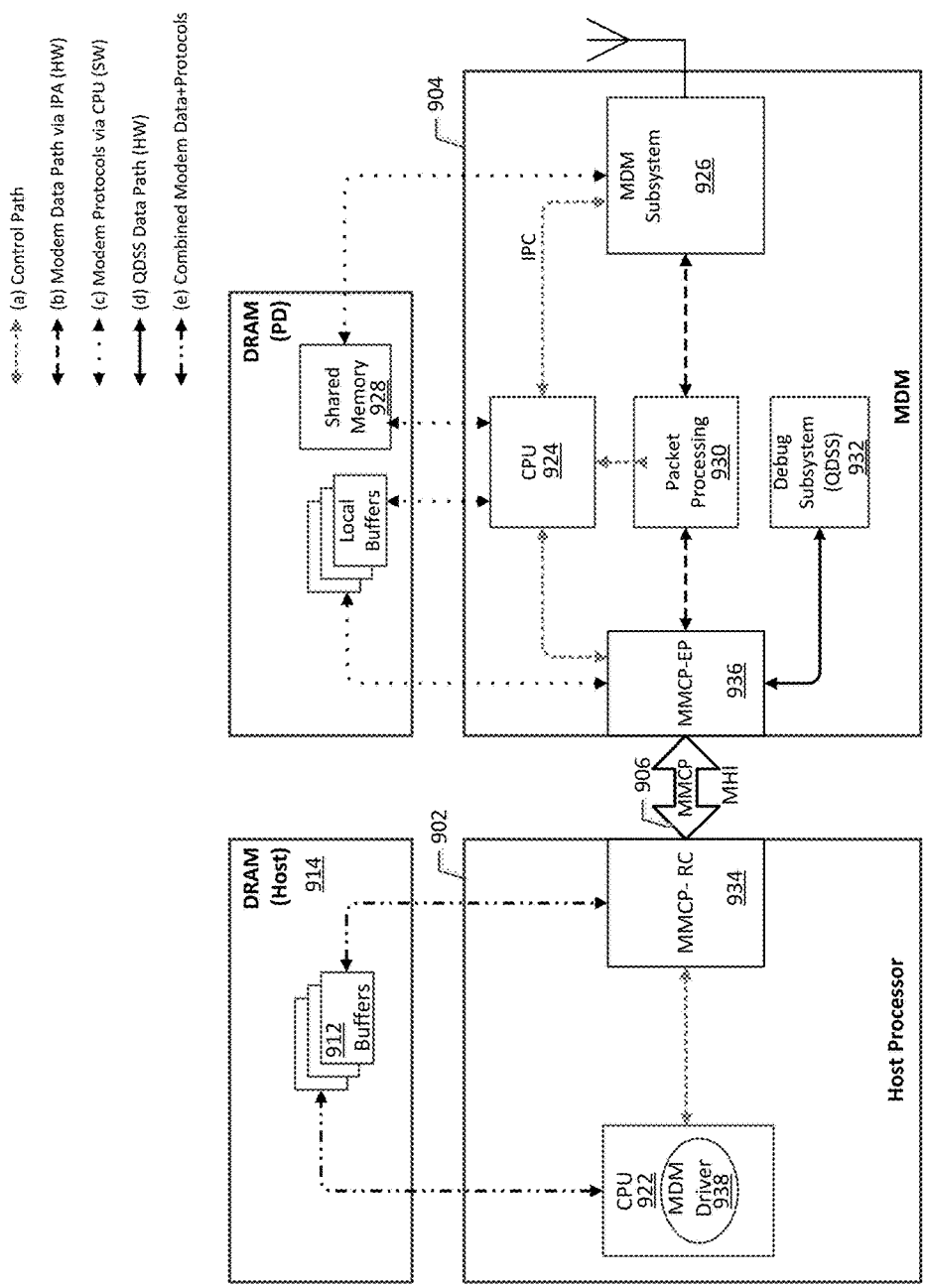
FIG. 9 is a block diagram depicting a high-level system architecture, including an MDM, host processor, their respective memories, and relevant internal blocks.

Referring next to FIG. 9, it is a block diagram depicting a high-level system architecture, including a host processor 902, cellular-communication modem (MDM) 904, their respective memories (DRAM), and relevant internal blocks.

Control Path: Software drivers controlling the relevant hardware blocks in the MDM 904 reside in the MDM CPU 924, including a modem-host interface driver, PCI-EP driver, packet-processing driver, and QDSS driver. The control paths defined in the diagram also include the interprocessor communication between the MDM CPU 924 and a MDM subsystem 926 (e.g., modem digital signal processor), usually over shared memory (SMD) 928.

The packet-processing component 930 provides hardware acceleration for a variety of packet processing functions in the MDM 904. It offloads the MDM subsystem 926 and the MDM CPU 924 by establishing a hardware path to process and convey data packets between the MDM subsystem 926 and the transport interface, such as PCIe or USB.

The packet-processing component 930 includes a modem-host interface engine (not shown) that is capable of processing the modem-host interface protocol (MHI) to exchange control and data buffers with the host processor 902 over a memory-mapped communication path 906 (e.g., PCIe). The MDM CPU 924 is not involved in this data path.

Various application-specific protocols may be transported between the MDM 904 and the host 902 over the memory-mapped communication path 906, such as data organized according to one or more cellular communication protocols (e.g., 2G, 3G, LTE, etc.), IP data (RmNet), cellular modem control messages (QMI), diagnostics (DIAG), debugging (QDSS), file system synchronization (EFS Sync), boot/software image download, and more. All these upper-layer protocols are multiplexed and transported via logical channels over the memory-mapped communication path 906 according to the device-host interface protocol (MHI). Most of these application-specific protocols do not require full hardware acceleration within the MDM 904 due to their particular performance requirements and data manipulation characteristics. A MHI driver (not shown) located in the MDM CPU 924 is responsible for processing the device-host interface protocol (MHI) to exchange control and data buffers with the host processor 902 over the memory-mapped communication path 906.

The QDSS component 932 is a hardware block providing tracing and debugging features over an external interface, such as USB or PCIe. The host processor 902 can communicate and control the QDSS component 932 by accessing a sub-set of its control registers and data pipe interfaces over the memory-mapped communication path (MMCP) 906. A memory-mapped communication path (MMCP) interface 934 can be used by the host processor 902 as a bus extension to access the QDSS control registers and its output data pipe(s). A QDSS host driver running on the host processor 902 (not shown) can use a direct memory access engine in the MMCP-EP 936 or an internal DMA engine in the QDSS component 932 to move data buffers across the MMCP 906 between the QDSS 932 internal buffers and the host memory 914 (e.g., DRAM). Controlling other hardware blocks in the MDM 904, which generate trace data, is performed via existing diagnostic messages (DIAG).

Combined MDM Data and Protocols: The novel modem-host interface protocol (MHI) provides the mechanisms to exchange control and data buffers between the MDM 904 and the host memory 914 over the memory-mapped communication path 906 (e.g., PCIe). An objective of the MHI protocol is to multiplex upper-layer protocols (or application-specific protocols) and transport them over the MMCP interface (e.g., PCIe or other memory-mapped-type of path). For example, upper-layer cellular communication protocols are multiplexed and transported over the MMCP 906 via logical channels set up according to the MHI protocol. Inside the host processor 902, all the different upper-layer protocols—which are transported over MHI—follow the same data path between the MMCP root complex and the CPU via the host memory 914 (e.g., DRAM). The MHI data structures and the data buffers 912 are located in the host memory 914. An MDM driver 938 implementing the MHI protocol on the host processor 902, the MMCP driver, and the upper-layer protocols software blocks reside in the host CPU 922.

The host processor 902 in many embodiments is realized by an application processor, but it is contemplated that other types of devices may also operate as the host processor 914.

As depicted, the host processor 902 has one or more memory-mapped communication path root complexes (MMCP-RC) 934 connected to the MDM 904 and/or other processing devices. As depicted, the MDM driver 938 runs on the host CPU 922, which implements the modem-host interface (MHI) protocol on the host processor 902. The MDM driver 938 uses a MMCP driver to access the MDM 904 address space, including the relevant MMCP configuration registers and MHI control registers (e.g., address translation registers, doorbells, etc.). The MDM driver 938 can also include a series of "host interface drivers" to transport upper-layer protocols on top of MHI, such as cellular data (e.g., 2G, 3G, LTE, etc.) IP data, control messages, diagnostics, etc. These interface drivers can expose legacy serial I/O APIs towards the upper layers for better software reuse.

The MMCP root complex (RC) driver in the host processor 902 is responsible to enumerate and configure the MMCP end points. The MMCP-RC driver also provides an API used by the MDM driver 938 to read/write from/to the MDM 904 memory space over the memory-mapped communication path (MMCP) 906. The MMCP-RC driver also processes and routes MMCP interrupts (e.g., PCIe interrupts) coming from the MDM 904 towards the host CPU 922. The relevant interrupts are then routed to the MDM driver 938 for further processing.

The host processor 902 only has limited access to the MDM 904 memory map, including registers to configure and control operation of the MDM 904. In many instances, memory access and DMA transfers are invoked by the MDM 904. The MMCP-RC 934 in the host processor 902 functions as a generic MMCP host (e.g., a PCIe host). It provides memory/registers access capabilities for the host CPU 922 towards the MDM 904 address space, and it provides memory access capabilities for the MDM 902 towards the host memory 914. The MMCP-RC 934 also generates CPU interrupts coming from the MDM 904 over the MMCP 906.

Host Memory: In many embodiments, data structures used by the MHI protocol are located in the host memory 914. The MDM 904 accesses those data structures over MMCP 906. Areas of the host memory 914, where DHI data structures and data buffers 912 are located, are mapped for the MDM 904. Then, the MMCP-EP 936 of the MDM 904 can access those memory areas directly through the host MMCP-RC 934. Security measures can be handled by a SMMU component located next to the MMCP-RC 934, where only specific memory regions would be accessible by the MDM 904.

Figure 10:
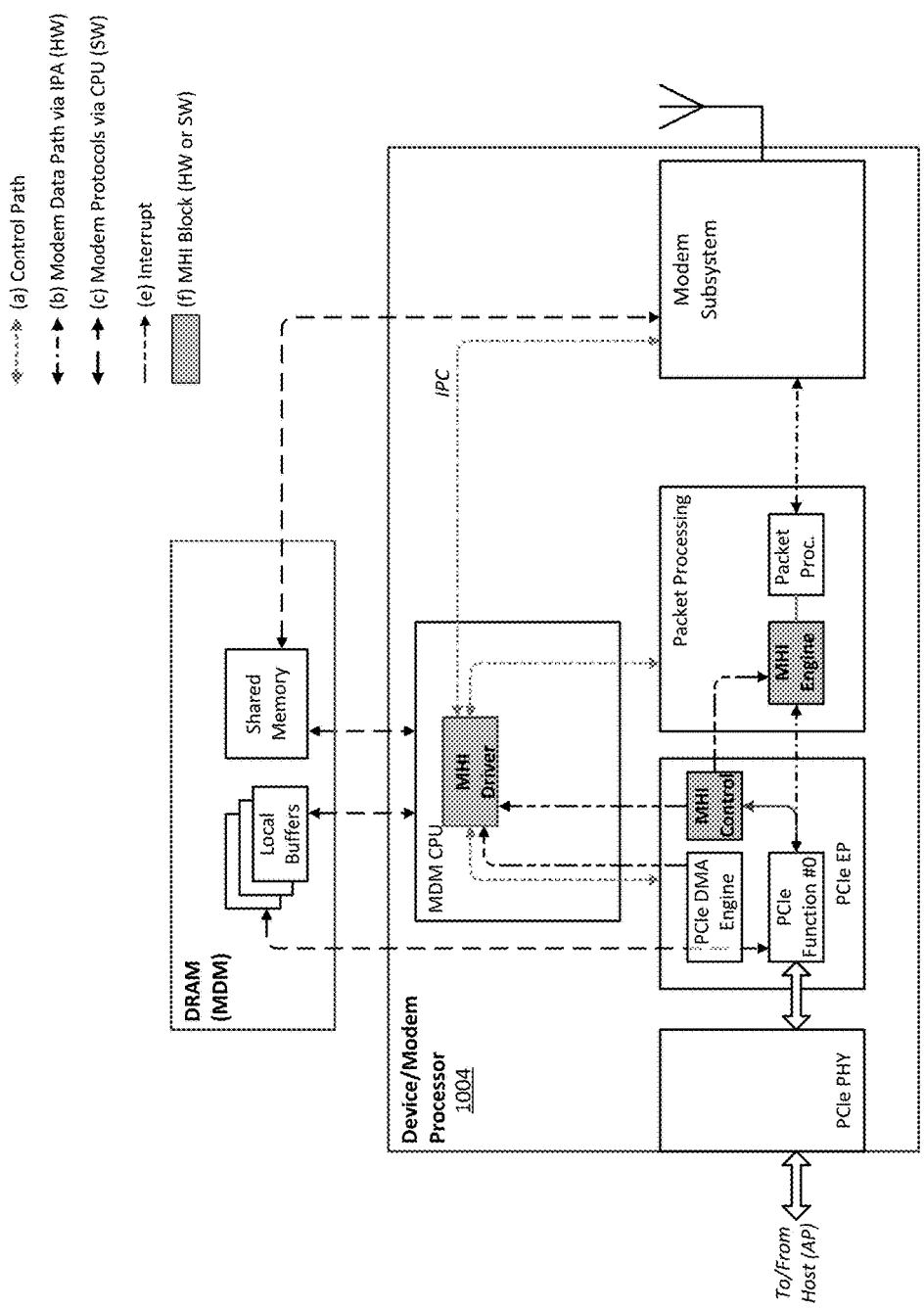
FIG. 10 is a block diagram illustrating an example of relevant blocks in the internal architecture of an MDM.

Referring next to FIG. 10 it depicts a MDM 1004 and a memory-mapped communication path 106 that is realized by a PCIe communication path. As in typical PCIe-based systems, the MDM 1004 is responsible for performing all the DMA transfers to/from the host processor memory space through internal DMA engines (e.g., the DMA engine in the PCIe-EP, or in the packet processing component). The depicted MDM 1004 may operate with the host processors described herein (generally represented by the host processor 102).

Modem (MDM) Processor (CPU): The MDM CPU is responsible for processing the MHI protocol for upper-layer protocols which are not accelerated by hardware, such as modem control messages (QMI), diagnostics (DIAG), file system synchronization (EFS sync), image download, etc. The MDM CPU communicates with the modem digital signal processing (DSP) firmware via existing shared memory mechanisms, such as a shared memory driver (e.g., SMD and SIO). The direct memory access (DMA) engine in the PCIe-EP is used by the software running on the MDM CPU to transfer buffers across the PCIe path to/from the AP DRAM.

Modem Subsystem: The Modem subsystem in the MDM 1004 does not have any direct interaction with the PCIe interface or the MHI protocol, since the PCIe interface and the MHI protocol are handled by the modem CPU and the packet-processing component. An objective of several embodiments is to decouple the modem subsystem (firmware and hardware) from the underlying transport interface towards the host processor 102. The modem subsystem transfers control and data packets to/from the PCIe-EP via the packet-processing component (hardware accelerated path) or via the MDM CPU (software-based path).

Packet Processing: The packet-processing component may be realized by a hardware block in the MDM 1004 that offloads several packet-processing functions from the modem DSP and from the MDM CPU, including packet header/tail processing, packet aggregation, and more. The packet-processing component may use BAM pipes as the main interface to communicate with other blocks in the MDM. Those memory pipes can reside in internal SRAM (BAM/BAM pipes) or external DRAM (BAM/System pipes). The MHI engine within the packet-processing component implements the MHI protocol to transfer control and data buffers to/from the host processor 102 in the hardware accelerated use cases. The MHI engine maintains internal buffers and data structures, and can also use the MDM DRAM to store and access temporary data structures to process the MHI protocol.

PCIe End Point (PCIe-EP): The PCIe-EP has a DMA engine, which can be used by the MDM CPU or other blocks in the MDM 1004 for transferring data buffers between the MDM and the host processor memory (e.g., host memory 914). The MHI control block in the PCIe-EP includes the necessary logic to support the MHI control registers (MMIO registers), which are exposed to the host processor 102 via PCIe.

MDM Memory (MDM DRAM): In some embodiments, all the actual MHI data structures and data buffers are located in the host processor memory (e.g., DRAM), and only temporary copies of those data structures are located in the MDM memory. The motivation to use the MDM DRAM for temporary data structures is to avoid excessive memory accesses by the MDM over PCIe to/from the host processor memory (or vise-versa), which would reduce the path efficiency and increase the system power consumption.

The MHI driver located in the MDM CPU implements the MHI protocol on the MDM side. The MHI Driver is responsible for managing internal buffers and configuring the relevant hardware blocks, such as the PCIe-EP and packet-processing component, for handling the MHI protocol. The MHI Driver can also include a series of "modem interface drivers" to transport upper-layer protocols on top of MHI, such as IP data, control messages, diagnostics, etc. These interface drivers can expose legacy serial I/O APIs towards the upper layers for better software reuse. For example:

RmNet Modem Interface Driver—Supports existing serial I/O APIs to transfer IP packets and QMI packets to/from the Modem DSM (over SMD).

EFS Sync Modem Interface Driver—Supports existing serial I/O APIs for the Remote File System software in the MDM.

DIAG Modem Interface Driver—Supports existing serial I/O APIs for the diagnostics software in the MDM.

Modem Interface Driver—Supports existing serial I/O APIs for image download and RAM dump.

Other "modem interface drivers" can be implemented to support additional functionality over the MHI protocol.

A PCIe-End Point (EP) driver in the MDM 1004 configures and controls the PCIe-EP. It also provides an API to transfer data buffer by the DMA engine in the PCIe-EP. A packet-processing master driver (not shown) may run in the MDM CPU, and it is responsible to configure and control the packet-processing component. The MHI driver controls the MHI engine in the packet-processing component through the packet-processing component driver API.

Since the data interface of the packet-processing component is based on BAM pipes, the IPA satellite driver running in the modem DSP sends and receives data packets to/from the IPA via the SPS driver.

Various mechanisms to transport cellular modem communication protocols (upper-layer protocols) over PCIe by using MHI are provided as the fundamental data exchange protocol. MHI is the interface protocol used to transport and manage data buffers between the host processor 102 and the cellular-communication modem (MDM) 104 via PCIe.

Backward compatibility with legacy upper-protocols—based on USB—is one benefit of this architecture design that enables the re-use of existing implementations, both hardware and software, and to facilitate the support of different interfaces across products.

The modem protocols transported over PCIe between the MDM and the host processor include:

IP Data (RmNet): Multiple data sessions (RmNet sessions) can be maintained concurrently by the modem with the network. A subset of these data sessions are terminated at the networking stack in the host processor operating system.

Modem Control Messaging (QMI): Modem control messages—encapsulated in QMI messages—are exchanged between the telephony software in the AP and the Modem subsystem in the MDM. QMI messages can also be used as a mean to exchange generic control and IPC messaging between the Host and the MDM.

Diagnostics (DIAG): Diagnostic messages are exchanges between the host processor 102 and the MDM CPU to control the operation of the diagnostics services in the MDM and to transfer diagnostics data to the host processor 102. The diagnostics software running in the MDM CPU is responsible for routing the control and data messages within the different sub-systems in the MDM.

File System Sync (EFS Sync): The MDM has the option to use a remote file system located in the host processor external storage device. The file system synchronization protocol (EFS Sync) is used to synchronize the data between the host processor storage and the MDM. The data blocks exchanged over the interface are encrypted to protect their content. The remote file system software running in the MDM CPU and in the host processor 102 implement this data exchange protocol.

The mapping of these upper-layer protocols over PCIe by using MHI as the transport infrastructure is described below.

Multiple MHI logical channels (data pipes) can be concurrently used across the memory-mapped communication path 106 between the host processor 102 and the MDM 1004 to multiplex several upper-layer protocols. Each upper-layer protocol will use a predefined set of MHI channels (data pipes) to transport control or data packets.

The "MHI channels configuration" is a set of MHI channels to transport all the protocols supported by the MDM. This configuration of channels needs to be agreed between the host processor 102 and the MDM 1004 to correlate each MHI channel with its corresponding upper-layer protocol.

The modem-host Interface (MHI) is designed to transport modem protocols and their corresponding control and data messages over the PCIe interface. Those messages are generated and consumed by application-specific protocol software. These upper-layer protocols use the APIs provided by the MHI software in the host (AP) and MDM to send and receive messages.

Figure 11:
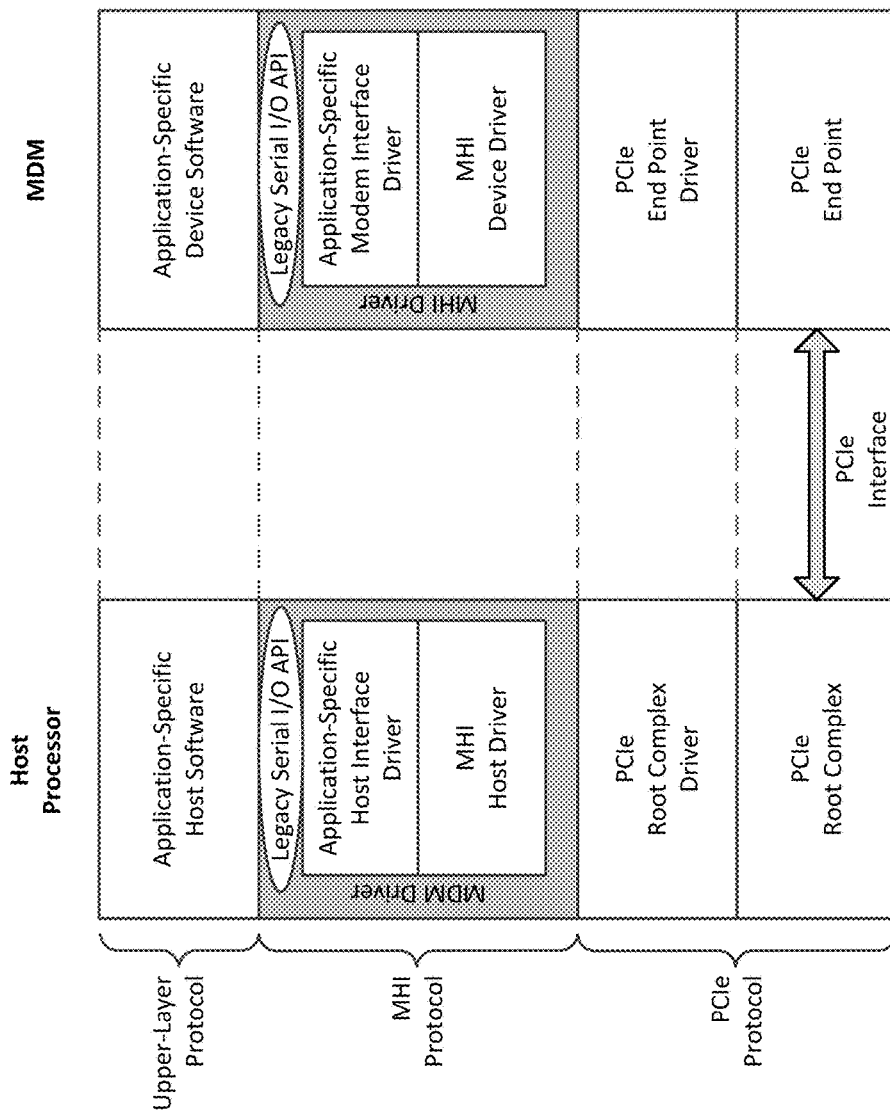
FIG. 11 depicts a generic protocol stack to transport application-specific protocols over MHI.

FIG. 11 depicts a generic protocol stack to transport application-specific protocols over MHI. The application-specific protocols are also referred to herein as modem protocols or upper-layer protocols and include cellular communication protocols.

The MHI Protocol layer includes two logical sub-layers:

The MHI host driver (in the host processor side) and MHI device driver (in the MDM side) implement the MHI procedures to exchange control and data messages over PCIe.

The application-specific host interface driver (in the host side) and modem interface driver (in the MDM side) implement the adaptation to the particular upper-layer protocols and expose the necessary APIs to the application-specific software blocks. These interface drivers can expose legacy serial I/O APIs towards the upper-layers for better software reuse.

Application packets are exchanged between the host processor 102 and the MDM 1004 over MHI logical channels. Each logical session uses a separate pair of MHI channels to transport the corresponding packets across the PCIe interface. The MHI channel configuration may include all the necessary channel pairs to support the total number of supported upper-layer applications.

Particular applications may need more than one pair of MHI channels depending on the specific characteristics of the application. For instance, multiple IP data sessions (multiple RmNet instances) will require multiple MHI channel pairs, one pair for each data session instance.

Command Ring Management: Most applications typically use a single memory buffer for each packet, which is represented by a single command descriptor (CD). That memory buffer is pointed to by a single command block (CB) in the CD.

An application packet spread over multiple memory buffers (i.e., Scatter/Gather) is pointed to by multiple CBs in a single CD. Each CB points to an individual memory buffer containing part of the application packet.

Packet Aggregation: The Host can use the various interrupt control flags in the CBs to control how often to process completed transfers of packets.

The following guidelines are suggestions to optimize the use of interrupts in the host processor:

Set IEOB='0' to avoid completion interrupts for individual CBs.

Set IEOT='1' in all CBs of a CD if an interrupt is needed for every full packet.

Otherwise, set IEOT='1' only in CBs of a CD every N packets. The tradeoff between the interrupt rate and the latency will determine the value of N.

For the host processor 102, the latter option is equivalent to aggregate multiple packets in a single transfer. The MDM 1004 will still process each packet as an individual transfer over PCIe.

To optimize the use of interrupts, when the host processor 102 gets an MHI interrupt from the MDM 1004, it should process all pending events posted by the MDM 1004 in the response ring associated with that particular interrupt.

The host processor 102 can also configure the interrupts moderation fields available for each response ring to reduce the number of interrupts.

In general, using packet aggregation techniques would require special attention on the size of command rings and response rings allocated by the host processor 102. Completed transfers and events may stay in their rings for longer periods of time until the processor gets the interrupt to start processing them. If those rings are not large enough, the system performance may be severely impacted by the lack of descriptors or "work items".

Figure 12:
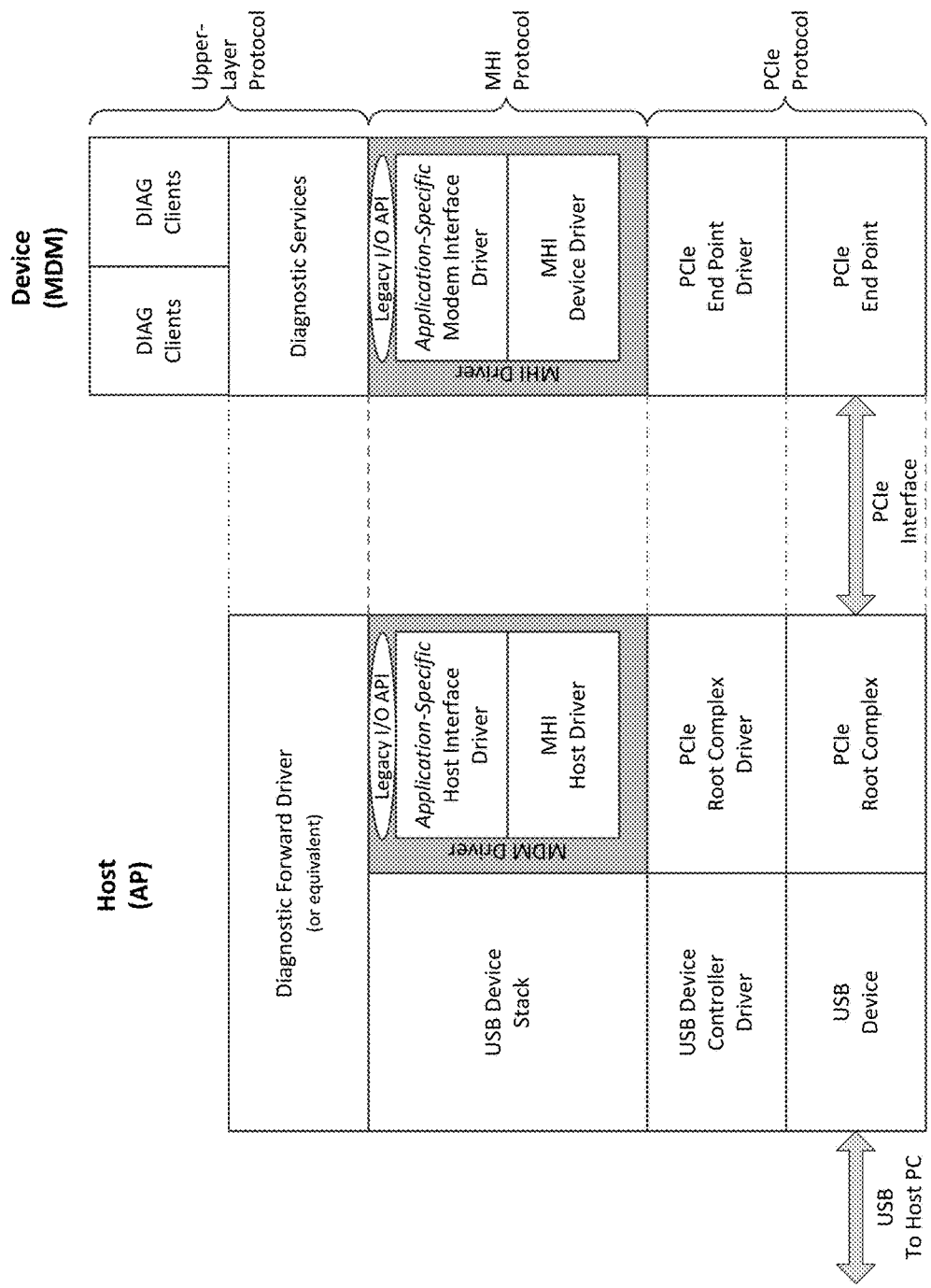
FIG. 12 depicts the position of MHI and PCIe in the overall diagnostics services.

Referring next to FIG. 12, it depicts the position of MHI and PCIe in the overall diagnostics services. The DIAG packets are generated and consumed by the DIAG software modules, which use the APIs provided by the MHI software in the host processor 102 and MDM 1004 to send and receive DIAG packets.

DIAG packets are exchanged between the host processor 102 and the MDM 1004 over MHI channels. A bi-directional data pipe is represented by a pair of channels—one for each direction. The MHI channel configuration may include all the necessary channel pairs to support the total number of supported upper-layer applications.

Command Ring Management: DIAG packets can be entirely contained in single memory buffer or can be spread over multiple memory buffers (Scatter/Gather).

A DIAG packet entirely stored in a single memory buffer uses a single command descriptor (CD). That memory buffer is pointed to by a single command block (CB) in the CD.

A DIAG packet stored in fragments over multiple memory buffers (Scatter/Gather) is pointed to by multiple CBs in a single CD. Each CB points to an individual memory buffer containing a fragment of the DIAG packet.

Packet Aggregation: The host processor 102 can use the various interrupt control flags in the CBs to control how often to process completed transfers of DIAG packets.

The following guidelines are suggestions to optimize the use of interrupts in the host processor 102:
  Set IEOB='0' to avoid completion interrupts for individual CBs.
  Set IEOT='1' in all CBs of a CD if an interrupt is needed for every full packet.
  Otherwise, set IEOT='1' only in CBs of a CD every N packets. The tradeoff between the interrupt rate and the latency will determine the value of N.

For the host processor 102, the later option is equivalent to aggregate multiple DIAG packets in a single transfer. The MDM will still process each DIAG packet as an individual transfer over PCIe.

To optimize the use of interrupts, when the host processor 102 gets an MHI interrupt from the MDM, it should process all pending Events posted by the MDM in the Response Ring associated with that particular interrupt.

The host processor 102 can also configure the interrupts moderation fields available for each response ring to reduce the number of interrupts. In general, using packet aggregation techniques would require special attention on the size of command rings and response rings allocated by the host processor. Completed transfers and events may stay in their rings for longer periods of time until the processor gets the interrupt to start processing them. If those rings are not large enough, the system performance may be severely impacted by the lack of descriptors or "work items."

Diagnostics traffic in the MDM 1004 is processed and routed by the MDM CPU (aka processor driven data path). DIAG clients can be located in different subsystems within the MDM 1004, such as the CPU itself, modem subsystem, etc. In those later cases, existing inter-processor communication (IPC) mechanisms, such as SMD, are used to exchange DIAG packets between the CPU and other subsystems.

The typical data path of application packets in the MDM 1004 is processed and routed by the MDM CPU (aka processor driven data path). Upper-layer protocols in the MDM 1004 are terminated within the MDM CPU itself, in the modem subsystem, or other subsystems (e.g., LPASS). In those later cases, existing inter-processor communication (IPC) mechanisms, such as SMD, are used to exchange upper-layer packets between other subsystems and the MDM CPU.

Figure 13:
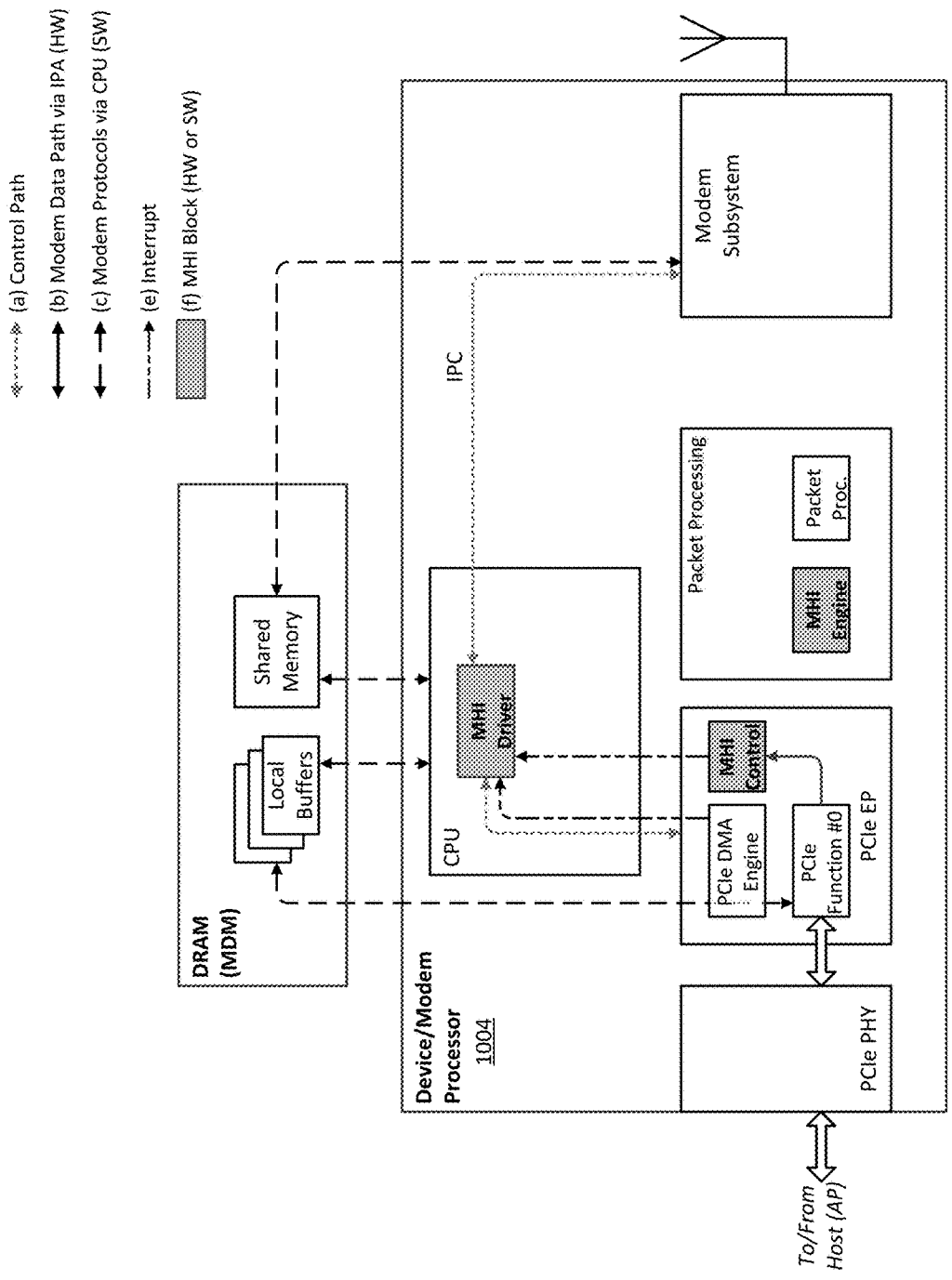
FIG. 13 illustrates the data path inside the MDM for a generic upper-layer protocol via the MDM CPU (processor driven data path).

FIG. 13 illustrates the data path inside the MDM 1004 for a generic upper-layer protocol via the MDM CPU (processor driven data path). The data path between the modem subsystem and the CPU is shown as an example of inter-processor communications (IPC) over shared memory. Other subsystems in the MDM would use similar mechanisms.

The MHI driver located in the MDM CPU is responsible for processing the MHI protocol to exchange control and data buffers with the host processor 102 over PCIe. It bridges between the application-specific upper-layer protocols and the PCIe inter-chip interface.

The MHI driver stores its internal data structures, working buffers in the MDM DRAM. The MHI driver also maintains partial copies of command rings in its command ring cache located in the DRAM as well. The command ring cache is an internal data structure of the MHI driver that is filled while processing doorbell interrupts coming from the host processor.

The MHI driver uses the DMA engine in the PCI-EP to move buffers between the MDM memory and the Host memory. The MHI driver also configures and controls the MHI MMIO registers located in the PCIe-EP via the PCIe Driver. The MHI doorbells are also located in the MMIO space. To implement the MHI protocol, the MHI driver processes interrupts generated by the doorbells. The MHI Driver also processes interrupts generated by the DMA engine in the PCIe-EP.

Multiple data sessions may exist between the MDM and the network. A subset of those data sessions terminate at the host processor networking stack. In addition, application-specific data sessions may exist between the host processor 102 and the MDM 1004 without further routing to the network.

IP Data Channels: As discussed above, IP packets are exchanged between the host processor 102 and the MDM 1004 over MHI channels. Each data session uses a separate pair of MHI channels to transport the corresponding IP packets across the PCIe interface. The MHI channel configuration includes all the necessary channel pairs to support the total number of supported data sessions.

Control messages associated with the data sessions are transported over a separate pair of MHI Channels, which are exclusively dedicated for modem control messages (such as QMI). Those control messages are not multiplexed with the IP packets in the same MHI Channels.

Command Ring Management: Individual IP packets are represented by a single command descriptor (CD) each. An IP packet fully contained in a single memory buffer is pointed to by a single CD with one Command Block (CB).

An IP packet spread over multiple memory buffers (i.e., scatter/gather) is pointed to by multiple CBs in a single CD. Each CB points to an individual memory buffer containing part of the IP packet.

Packet Aggregation: The Host can use the various interrupt control flags in the CBs to control how often to process completed transfers of IP packets. The following guidelines are suggestions to optimize the use of interrupts in the Host processor:

Set IEOB='0' to avoid completion interrupts for individual CBs.

Set IEOT='1' in all CBs of a TD if an interrupt is needed for every IP packet.

Otherwise, set IEOT='1' only in CBs of a CD every N packets. The tradeoff between the interrupt rate and the latency will determine the value of N.

For the host processor 102, the later option is equivalent to aggregate multiple packets in a single transfer. The MDM 1004 will still process each IP packet as an individual transfer over PCIe.

To optimize the use of interrupts, when the host processor 102 gets an MHI interrupt from the MDM 1004, it should process all pending Events posted by the MDM in the Response Ring associated with that particular interrupt.

The host processor 102 can also configure the interrupts moderation fields available for each response ring to reduce the number of interrupts. In general, using packet aggregation techniques would require special attention on the size of Command rings and response rings allocated by the host processor 102. Completed Transfers and Events may stay in their rings for longer periods of time until the processor gets the interrupt to start processing them. If those rings are not large enough, the system performance may be severely impacted by the lack of descriptors or "work items".

The MHI functionality for transporting IP packets over PCIe can be processed in two different paths in the MDM:

Hardware Accelerated-via IPA Block: The IPA provides hardware acceleration for a variety of packet processing functions in the MDM 1004. It offloads the modem subsystem and the MDM CPU by establishing a hardware path to process and convey data packets between the Modem subsystem and the transport interface, such as PCIe or USB. The packet-processing component includes the MHI engine, capable of processing the modem-host interface protocol (MHI) to exchange control and data buffers with the host processor over PCIe.

1. Processor Driven-via MDM CPU: The MHI driver located in the MDM CPU is responsible for processing the MHI protocol to exchange control and data buffers with the Host over PCIe.

A predefined subset of MHI channels is configured to use the hardware accelerated data path, while another predefined subset of MHI channels are configured to use the processor driven data path. That configuration of channels may be fixed, and in some implementations MHI channels cannot be re-configured after reset/restart.

Figure 14:
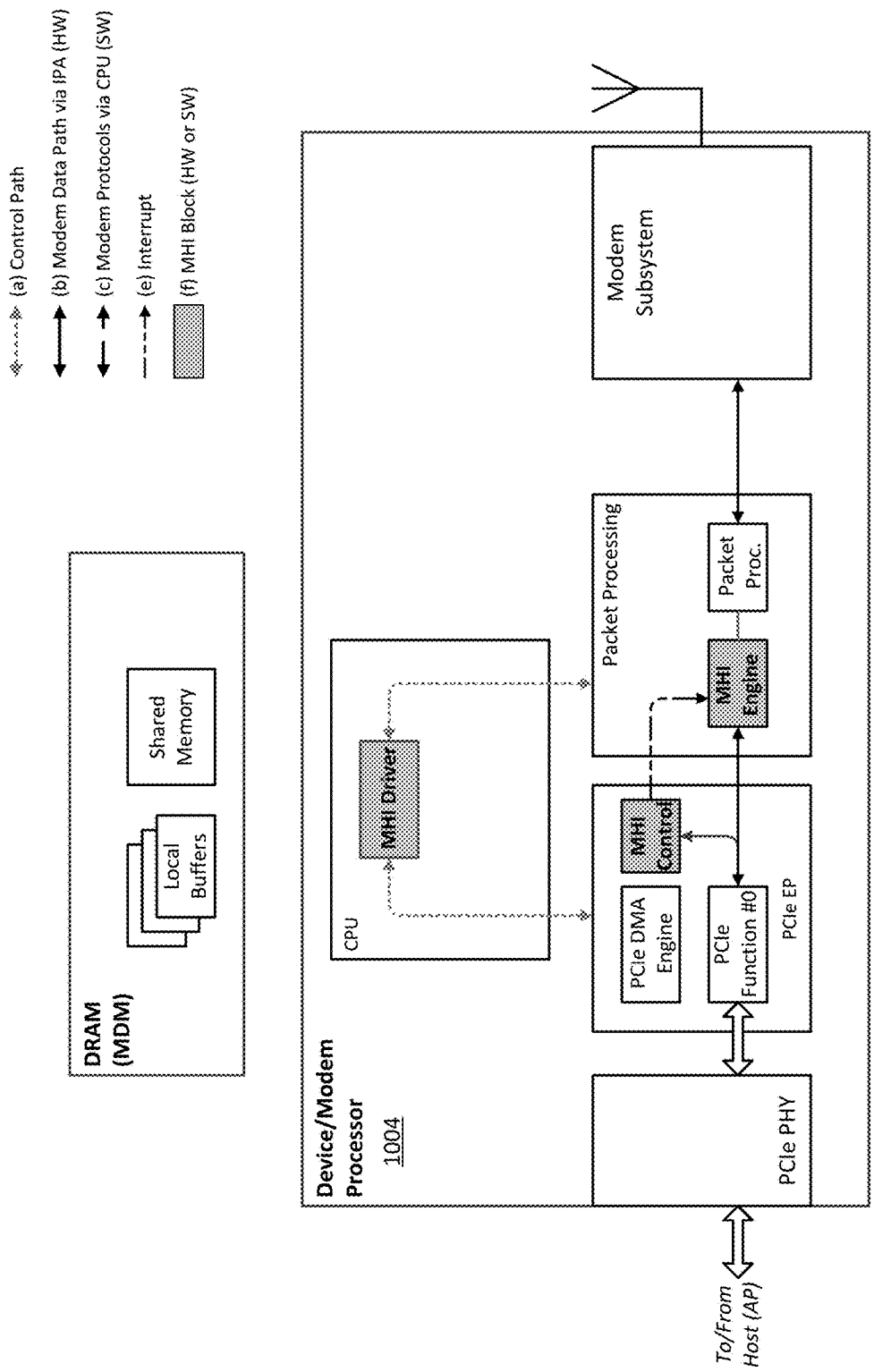
FIG. 14 illustrates show the hardware accelerated data path in the MDM for IP packets.

FIG. 14 illustrates show the hardware accelerated data path in the MDM for IP packets. The modem subsystem and the IPA exchange IP packets via a memory data pipe (BAM/System pipe), which resides in the MDM DRAM. The same data exchange mechanisms are used between the modem subsystem and the IPA block regardless of the inter-chip interface type used to communicate with the host processor 102, such as USB or PCIe. The modem subsystem is agnostic to the type of inter-chip interface.

The packet-processing component handles packet processing, such as headers manipulation, and the MHI engine implements the MHI functionality to exchange control and data buffers with the host processor 102 over PCIe. The packet-processing component uses its internal memory as the working space to store temporary packets and auxiliary data structures.

The MHI control block in the PCIe-EP implements the MHI MMIO registers. The Doorbell registers, which are located in the MHI control block, are involved in the data path by forwarding interrupts to the MHI Engine. Data packets are moved between the packet processing component and the PCIe end point via the system NOC. The MHI engine can use its internal DMA for moving data packets to/from the PCIe-EP, or it can use the available DMA engine of the PCIe-EP. The MHI driver located in the MDM CPU controls the configuration and operation of the IPA block and the PCIe End Point, but it is not involved in the hardware accelerated data path.

Figure 15:
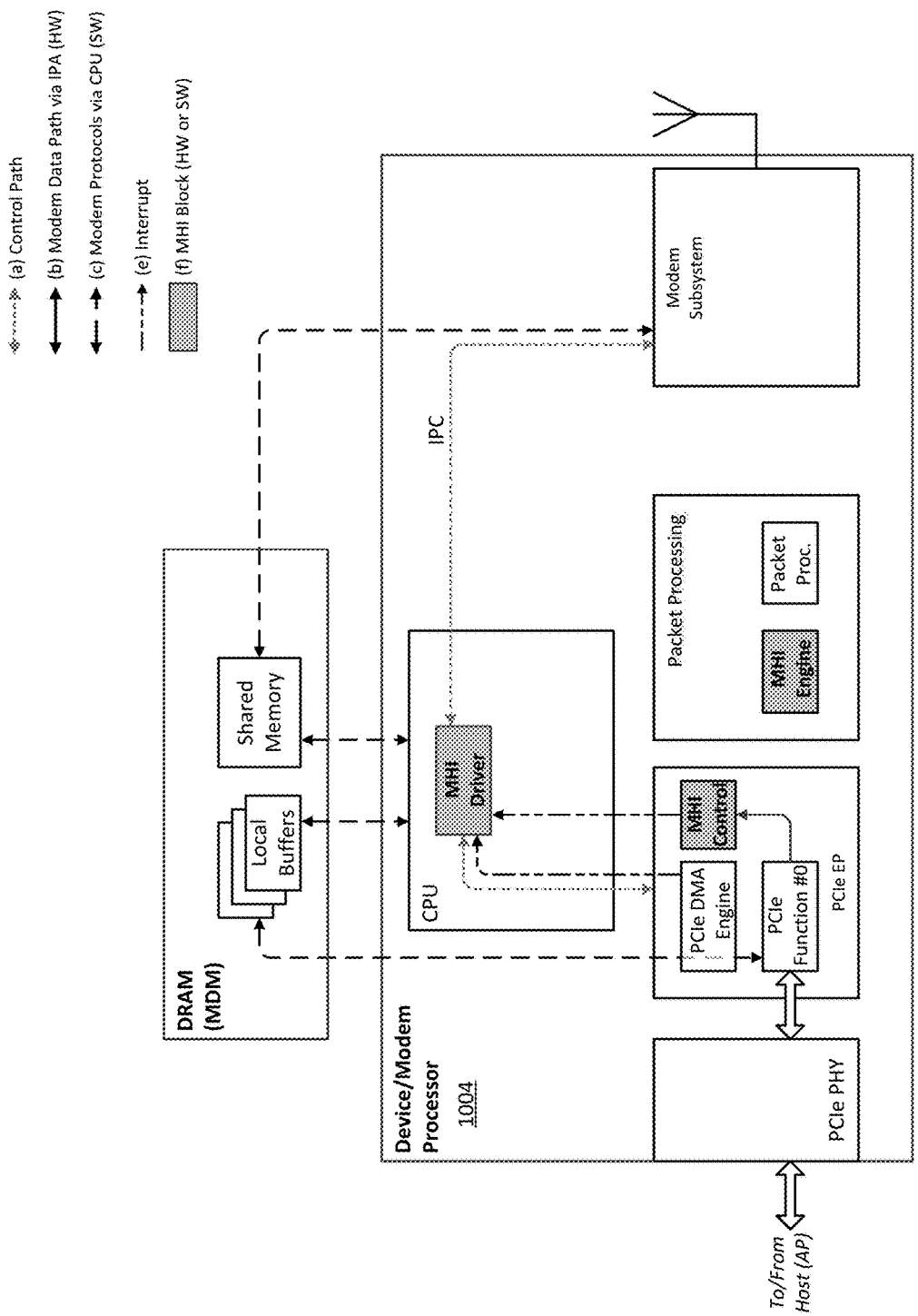
FIG. 15 illustrates the processor driven data path in the MDM for IP packets.

FIG. 15 illustrates the processor driven data path in the MDM 1004 for IP packets. The modem subsystem and the MDM CPU can exchange IP packets over existing interprocessor communication (IPC) mechanisms, such as SMD. The same data exchange mechanisms are used between the modem subsystem and the MDM CPU regardless of the inter-chip interface type used to communicate with the Host, such as USB or PCIe. The modem subsystem is agnostic to the type of inter-chip interface.

The MHI driver running in the MDM CPU implements the MHI protocol to exchange control and data buffers with the Host across the PCIe interface. The MHI driver is responsible to bridge the data path between the modem subsystem and the PCIe end point:

The MHI driver uses the DMA engine in the PCI-EP block to move buffers between the MDM DRAM and the host memory.

The MHI driver configures and controls the MHI MMIO registers located in the PCIe-EP via the PCIe Driver. The MHI Doorbells are also located in the MMIO space.

If necessary, the MHI driver (or its internal software modules) re-format the packet headers to translate between the packet formats supported by the Modem Subsystem and the formats supported by the Host software. IP packets may or may not be encapsulated into higher-layer data packets, such as NCM, MBIM, or other.

To implement the MHI protocol, the MHI driver processes interrupts generated by the doorbells in the MMIO register space in the PCIe-EP. The MHI driver also processes interrupts generated by the DMA engine in the PCIe-EP.

Modem control messages, such as QMI or MBIM, are used by the host processor 102 to control the configuration and operation of the modem interface, and it is used by the MDM 1004 to communicate indications or notifications to the host processor 102 regarding the operation of the modem interface.

From the MHI perspective, modem control messaging—such as QMI or MBIM—are handled as any other generic upper-layer protocol. One QMI logical session exists between the host processor and the MDM 1004 to exchange modem control messages. Different types of QMI messages are multiplexed over the single QMI session. QMI messages are then routed to the appropriate software modules for processing based on their contents. For example in the MDM, QMI messages are produced and consumed by different software modules located in the MDM CPU and in the modem subsystem (DSP). Existing inter-processor communication (IPC) mechanisms are used to route QMI messages across subsystems in the MDM. It should be noted that multiple QMI logical sessions may be implemented in connection with the embodiments disclosed herein.

Modem control messages, such as QMI or MBIM, are exchanged between the host processor 102 and the MDM 1004 via PCIe by using the modem-host interface (MHI) as the transport protocol. The nature and characteristics of the data traffic associated with modem control messages can be handled by MHI as a generic upper-layer protocol.

If multiple logical sessions are used to exchange modem control messages, then more than one pair of MHI channels may be needed. For instance, if there is a need to separate the QMI messages and MBIM messages in two different logical sessions, then two pairs of MHI Channels will be needed.

Command Ring Management: Typically, Modem control messages are fully contained in a single memory buffer, which is represented by a single command descriptor (CD). That memory buffer is pointed to by a single command block (CB) in the CD.

A Modem control message can also be spread over multiple memory buffers (i.e., Scatter/Gather). In this last case, the buffers containing the message are pointed to by multiple CBs in a single CD. Each CB points to an individual memory buffer containing part of the message.

Packet Aggregation: The traffic characteristics of modem control messages (QMI or MBIM), which are low throughput and relatively infrequent, do not require packet aggregation to optimize the use of interrupts in the Host processor.

The following guidelines are suggestions to control the use of interrupts in the Host processor for Modem control messages:
  Set IEOB='0' to avoid completion interrupts for individual CBs.
  Set IEOT='1' in all CBs of a CD.

The data path for Modem control messages (QMI or MBIM) in the MDM is processed and routed by the MDM CPU (aka processor driven data path).

Modem control messages are routed within the MDM to the appropriate software modules based on their contents. For example, QMI messages are produced and consumed by different software modules located in the MDM CPU and in the modem subsystem (DSP). Existing inter-processor communication (IPC) mechanisms, such as SMD, are used to route those messages across subsystems in the MDM 1004.

Figure 16:
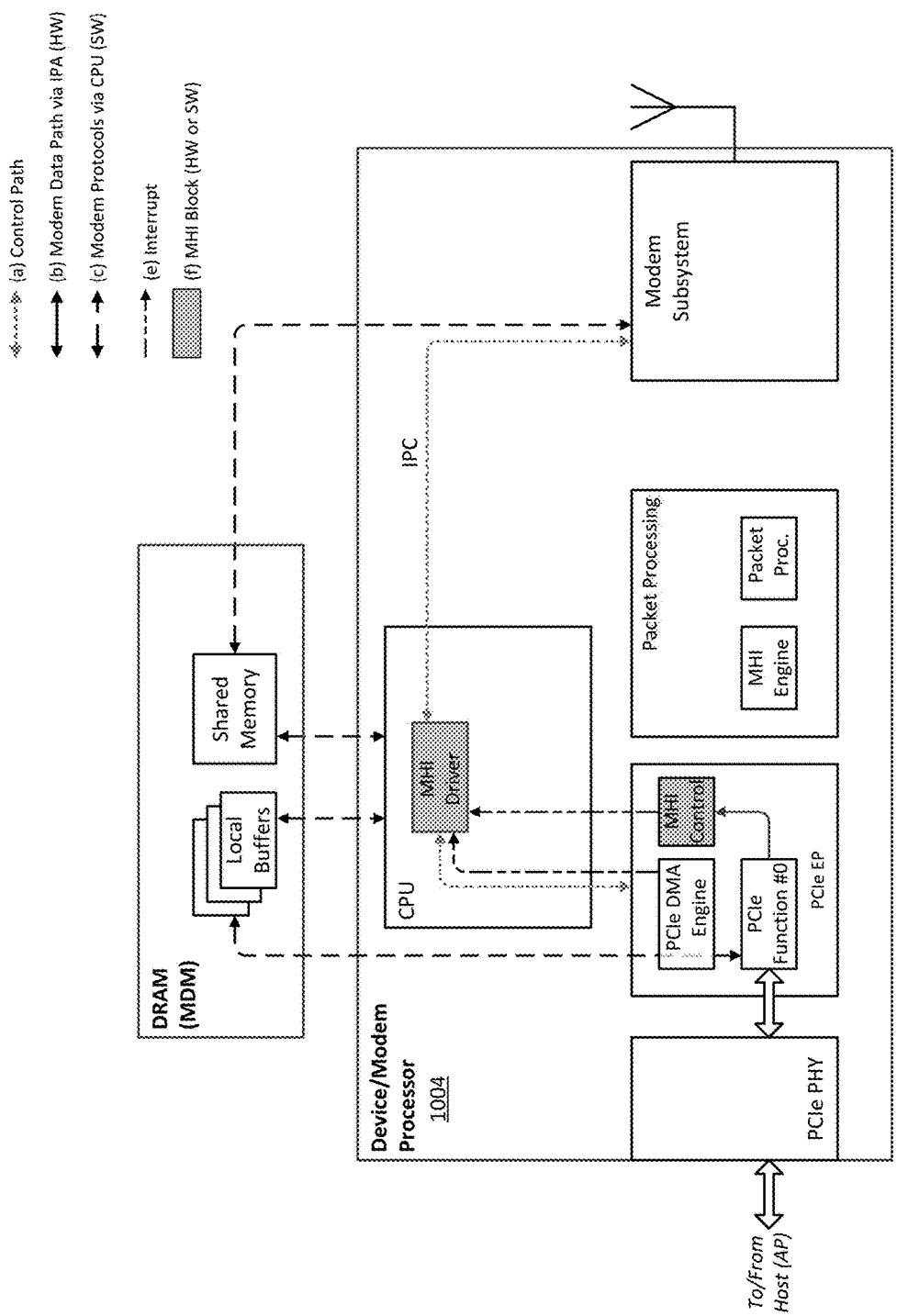
FIG. 16 illustrates the data path inside the MDM for modem control messages.

FIG. 16 illustrates the data path inside the MDM 1004 for Modem control messages (QMI or MBIM). The MHI driver located in the MDM CPU is responsible for processing the MHI protocol to exchange control and data buffers with the host processor 102 over PCIe. It bridges between the application-specific upper-layer protocols (QMI or MBIM software in this case) and the PCIe inter-chip interface.

The MHI driver stores its internal data structures, working buffers in the MDM DRAM. The MHI driver also maintains partial copies of command rings in its command ring cache located in the DRAM as well. The command ring cache is an internal data structure of the MHI driver that is filled while processing doorbell interrupts coming from the host processor 102.

The MHI driver uses the DMA engine in the PCI-EP to move buffers between the MDM memory and the host memory. The MHI driver configures and controls the MHI MMIO registers located in the PCIe-EP via the PCIe driver. The MHI Doorbells are also located in the MMIO space. To implement the MHI protocol, the MHI driver processes interrupts generated by the doorbells. The MHI driver also processes interrupts generated by the DMA engine in the PCIe-EP. As depicted, the packet-processing component is not actively involved in the processor driven data path.

Diagnostic services packets are exchanged between the MDM and the host processor over PCIe by using MHI as the transport protocol. As a general overview, the functionality provided by diagnostic services is as follows:
  DIAG request/response packet processing and routing within the system.
  Logging service.
  Event reporting service.
  Debug messages service.

Beneficially this architecture design enables the transport of DIAG packets over the PCIe interface without affecting the rest of the diagnostic services modules, which are agnostic to the inter-chip interface between the Host (AP) and the MDM.

FIG. 16 also shows the data path inside the MDM for DIAG traffic via the MDM CPU (processor driven data path). The data path between the modem subsystem and the CPU is shown in the diagram as an example of Inter-Processor Communications (IPC) over shared memory. Other subsystems in the MDM would use similar mechanisms.

The MHI driver located in the MDM CPU is responsible for processing the MHI protocol to exchange control and data buffers with the Host over PCIe. It bridges between the application-specific upper-layer protocols (Diagnostic Services in this case) and the PCIe inter-chip interface.

The MHI driver stores its internal data structures, working
  buffers in the MDM DRAM. The MHI driver also
  maintains partial copies of command rings in its command ring cache located in the DRAM as well. The
  transfer ring cache is an internal data structure of the
  MHI Driver that is filled while processing Doorbell
  interrupts coming from the Host.
The MHI driver uses the DMA engine in the PCI-EP to
  move buffers between the MDM memory and the Host
  memory. The buffers may contain DIAG packets.
The MHI driver configures and controls the MHI MMIO
  registers located in the PCIe-EP via the PCIe driver.
  The MHI doorbells are also located in the MMIO
  space.
To implement the MHI protocol, the MHI driver processes interrupts generated by the doorbells. The MHI
  driver also processes interrupts generated by the DMA
  engine in the PCIe-EP.
The IPA block is not actively involved in the processor
  driven data path.

Figure 17:
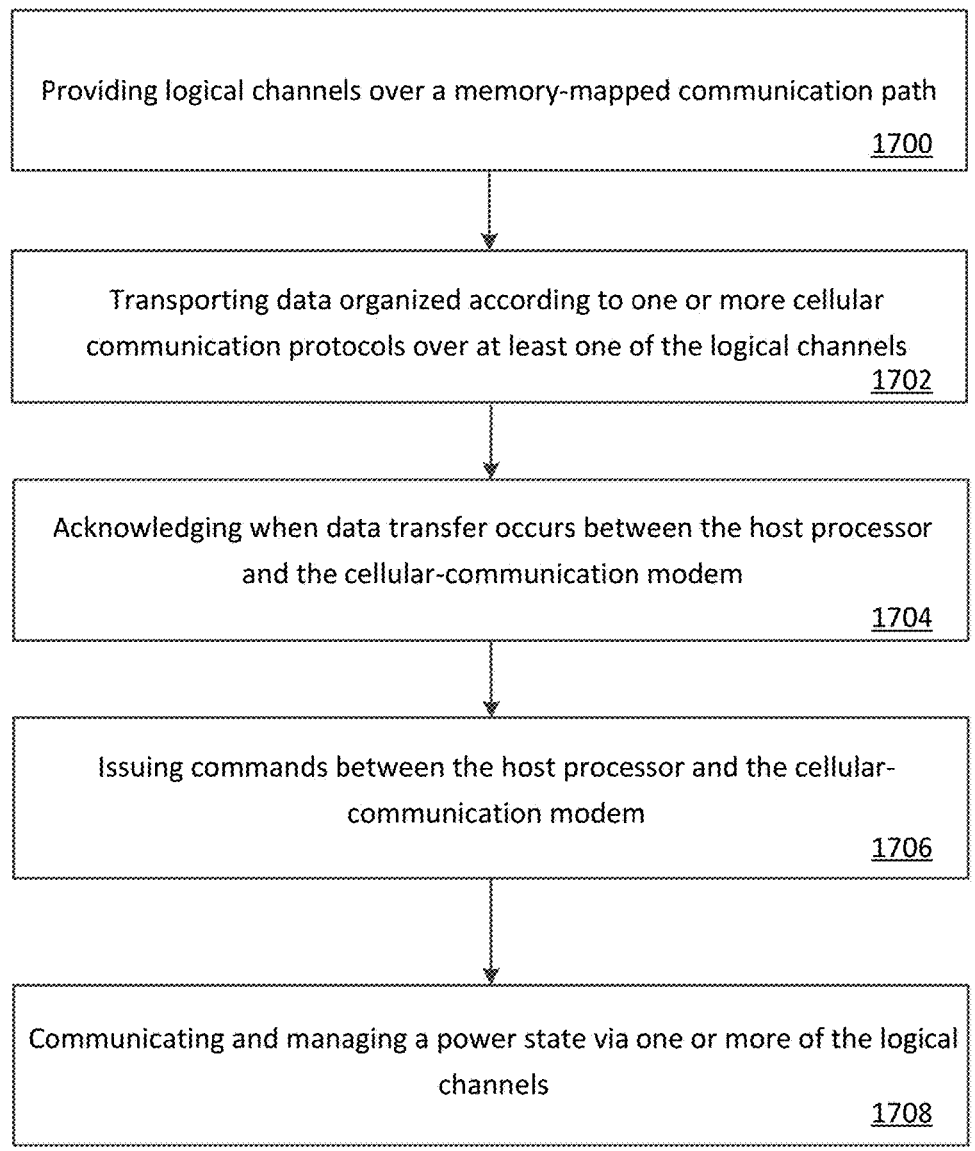
FIG. 17 is a flowchart illustrating a method that may be traversed in connection with several embodiments.

Referring next to FIG. 17, it is a flowchart depicting a method that may be traversed in connection with the embodiments disclosed herein. As depicted, logical channels are provided over a memory-mapped communication path (Block 1700), and data organized according to one or more cellular communication protocols is transported over at least one of the logical channels (Block 1702). In addition, there is an acknowledgment when data transfer occurs between the host processor and the cellular-communication modem (Block 1704). The method also includes issuing commands between the host processor and the cellular communication modem (Block 1706) and communicating and managing a power state via one or more of the logical channels (Block 1708).

Figure 18:
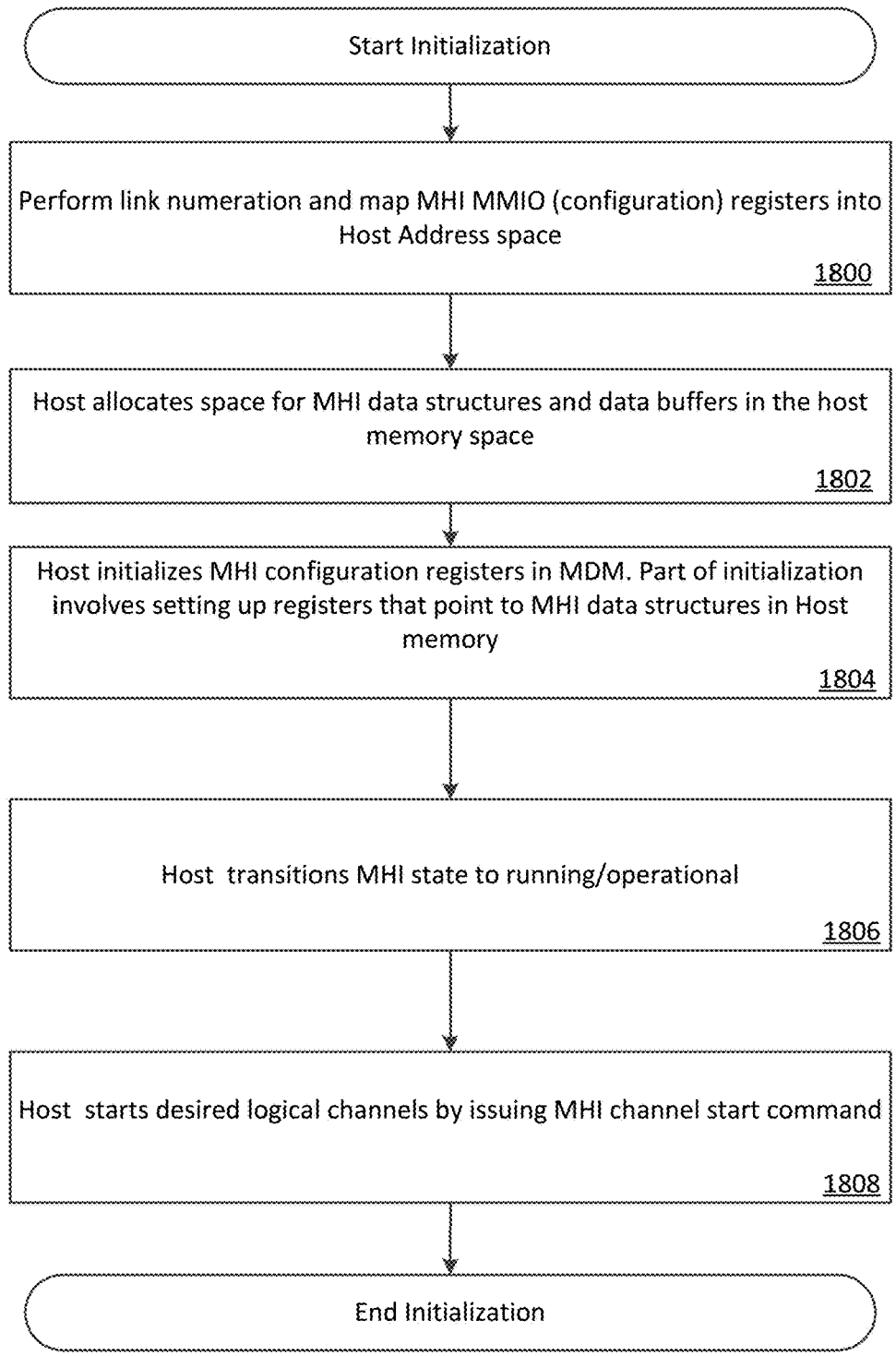
FIG. 18 is a flowchart depicting a method for initiating a device-host interface.

FIG. 18 is a flowchart illustrating a method for initializing a modem-host interface (MHI). As shown, when a host processor (e.g., host processor 102) performs power-on-reset, it enumerates the MDM device. During enumeration, MHI configuration registers are mapped into host memory space (Block 1800). The host processor also allocates space for MHI data structures and data buffers in the host memory space (host DRAM) (Block 1802). The MHI data structures facilitate creating logical unidirectional data pipes between a host and device over PCIe (via channel context) and enable scatter-gather data transfers between host and device over PCIe (via a transfer ring). In addition, the data structures enable acknowledgment/confirmation of data transfer (via event ring), and enable command and power state management (via a command ring).

As shown, the host processor initializes MHI configuration registers in the cellular-communication modem (Block 1804). The MDM uses these configuration registers to gain access to the MHI data structures in host processor memory space, and the host processor transitions the MHI state to a running/operational state (Block 1806).

As depicted, the host processor can start logical channels by issuing channel ctart commands. Data transfers can be initiated for such channels (Block 1808).

More particularly, to initialize MHI in the device, the host processor initializes the host system memory map by allocating a memory region where:

The MHI data structures are located, including context arrays and rings.
The data buffers (heap) are located, and the MDM accesses this memory region to read from and write to data buffers in the host memory. Ring elements point to buffers located in this memory region.

After reset (power-up reset, hardware reset, or MHI reset), the host must wait until MHISTS.READY is 1 before setting any MMIO registers. When the device is ready to accept MHI register writes, it clears (0) the READY bit after reset and sets it to 1.

The host processor also initializes the command ring by allocating (in the host memory) the:
Command ring buffer
Command context Then, the host processor sets the command context address pointer (CRCBAP) with the command context address.

The host processor also initializes the channel context array in order to:
Allocate and initialize the transfer ring for each channel;
Allocate and initialize the channel context array in the host memory;
Initialize and configure the supported channel contexts; and
Set the channel context array base address pointer (CCABAP) register with the address of the channel context array.

The host processor also initializes the event context array in order to:
Allocate and initialize each event ring in the host memory;
Allocate and initialize the event context array in the host memory;
Initialize and configure the supported event rings; and
Set the event context array base address pointer (ECABAP) register with the address of the event context array The host processor also initializes the interrupts in order to:
Configure the PCIe MSI capability registers and enable the interrupts used for the event rings; and
Configure the interrupt index (MSI index) for every event ring in the corresponding event context data structures The host processor also enables MHI operation by setting MHICTRL.MHISTATE to M0, and the host processor waits for the MHI state change event indicating the transition to M0 state by the device. MHI is operational and the data pipes between the host and device are functional.

Figure 19:
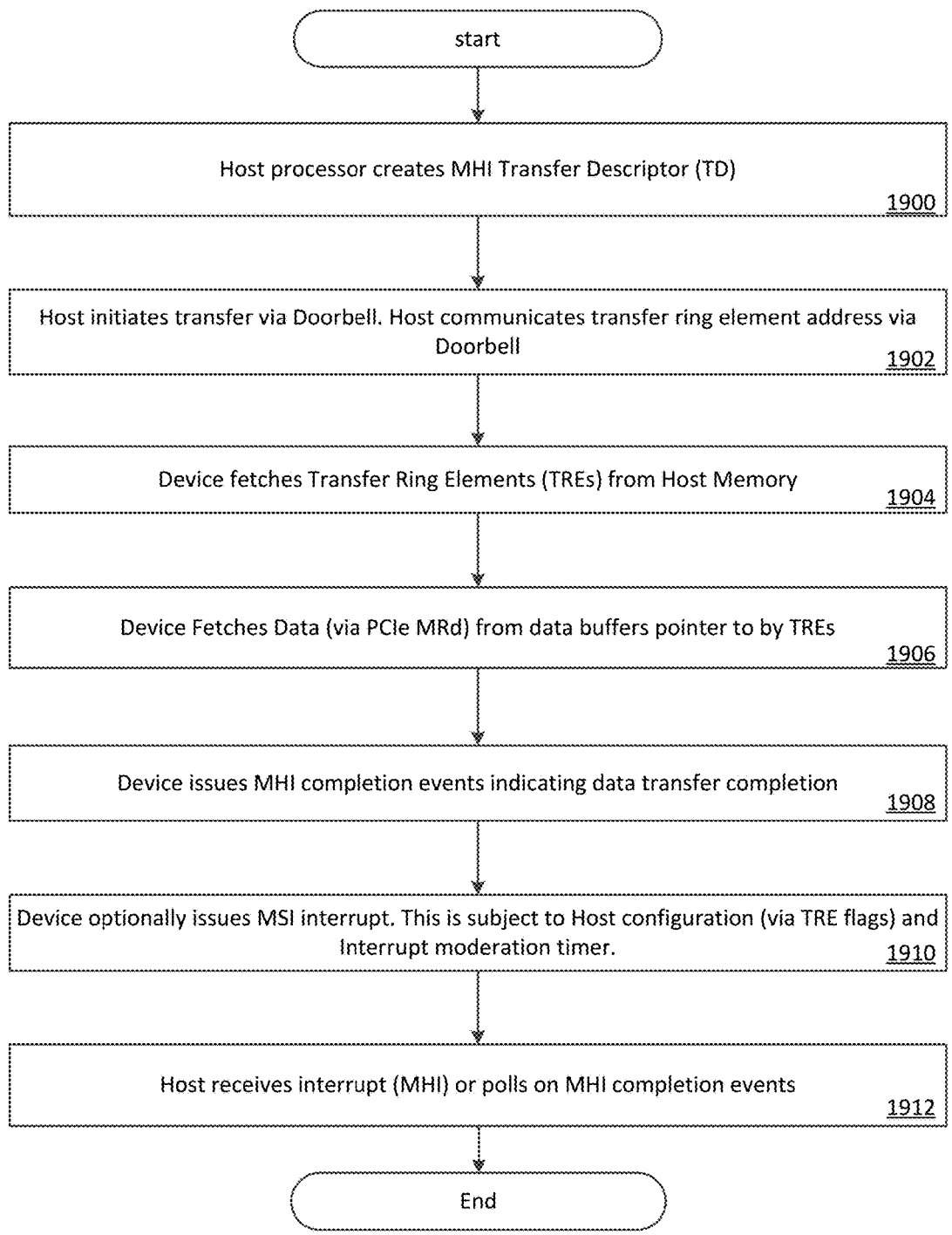
FIG. 19 is a flowchart illustrating a method for communicating from a host processor to a cellular-communication modem (MDM).

FIG. 19 is a flowchart depicting a method for data transfer from a host processor to a MDM (e.g., MDM 1004). As depicted, the host processor sets up MHI transfer data structures required for data transfer including a MHI transfer descriptor (TD), which may include of one or more MHI transfer ring elements (TRE)(Block 1900). In many implementations, TREs contain data buffer address, size and flags to control transfer behavior. As shown, the host processor then initiates a transfer via a doorbell (Block 1902). For example, the host processor may inform the MDM of its intent to initiate transfer by writing the transfer descriptor address into the MHI channel doorbell configuration register—this procedure is referred to herein as a "doorbell ring." The host processor also writes to configuration registers is via PCIe MWr request.

Upon receiving the doorbell, the MDM fetches required transfer ring elements (TRE) from the host address via PCIe MRd requests (Block 1904). TREs contain the data buffer description and other configuration flags. The MDM then reads data buffers by initiating PCIe MRd requests to data buffer address contained in TREs (Block 1906). The MDM then issues a data transfer completion event to the host using MHI event ring (Block 1908). The MDM may also optionally (if the host processor specifies intent via TREs) issue interrupts to the host processor (Block 1910). This is interrupt issuance is by way of PCIe MSI, but it should be recognized that the logical channels do have an interrupt moderation scheme, where the host processor can configure device to regulate/moderate the interrupt interval. As depicted, the host processor receives the interrupt (or poll) and processes data transfer completion events, and the host processor now has confirmation that MDM received data (Block 1912).

Figure 20:
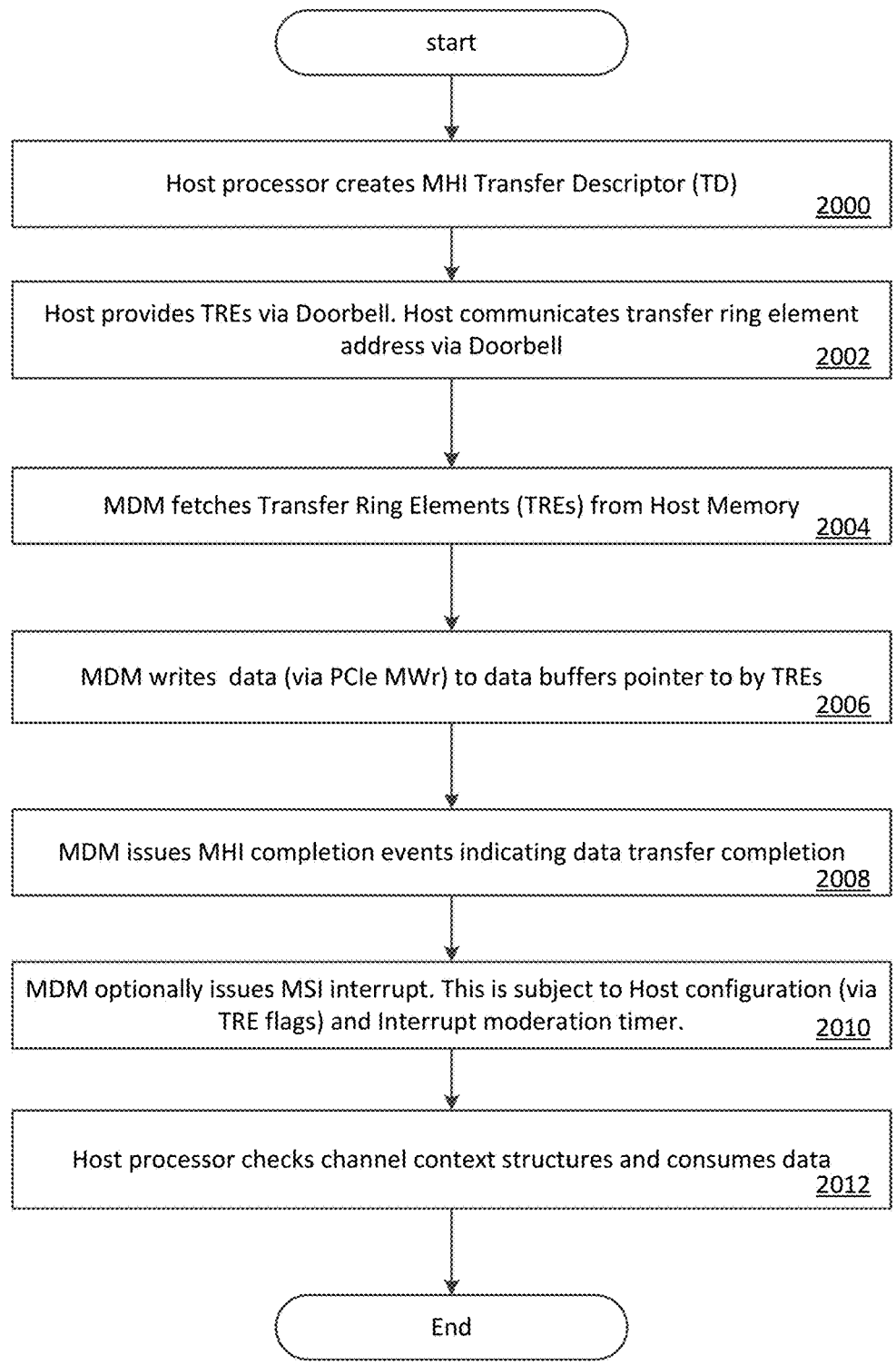
FIG. 20 is a flowchart illustrating a method for communicating from an MDM to a host processor.

Referring next to FIG. 20, it is a flowchart illustrating a method for data transfer from an MDM to a host processor. As depicted, the host processor sets up MHI transfer data structures required for data transfer including a MHI transfer descriptor (TD), which may include of one or more MHI transfer ring elements (TRE)(Block 2000). In many implementations, TREs contain data buffer address, size and flags to control transfer behavior. As shown, the host processor then provides TREs via a doorbell (Block 2002), and the MDM fetches transfer ring elements (TRE) from the host processor address via PCIe MRd requests (Block 2004). TREs contain the data buffer description and other configuration flags to device.

As shown, the MDM then writes transfer units into one or more of the available TD(s)(Block 2006), and the MDM issues a data transfer completion event to the host processor using an MHI event ring (Block 2008). The MDM may also optionally (if the host processor specifies intent via TREs) issue interrupts to the host processor (Block 2010). This issuance is by way of PCIe MSI, but MHI does have interrupt moderation scheme, where host can configure device to regulate/moderate the interrupt interval. As shown, the host processor then checks the appropriate channel context structures and TD(s) and consumes the data (Block 2012).

Figure 21:
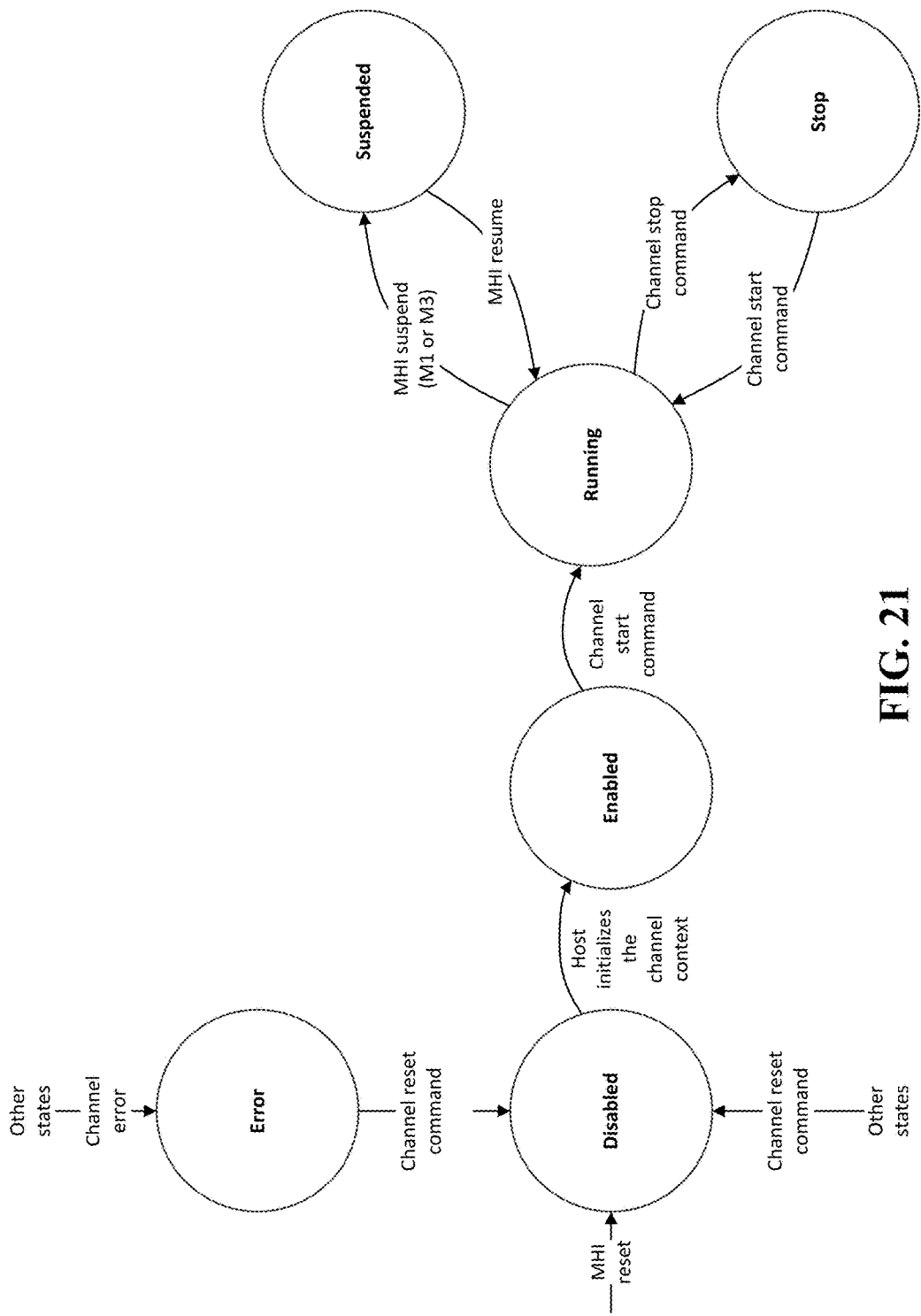
FIG. 21 is a diagram depicting a channel state machine.

Referring next to FIG. 21, it is a diagram depicting a channel state machine.

Figure 22:
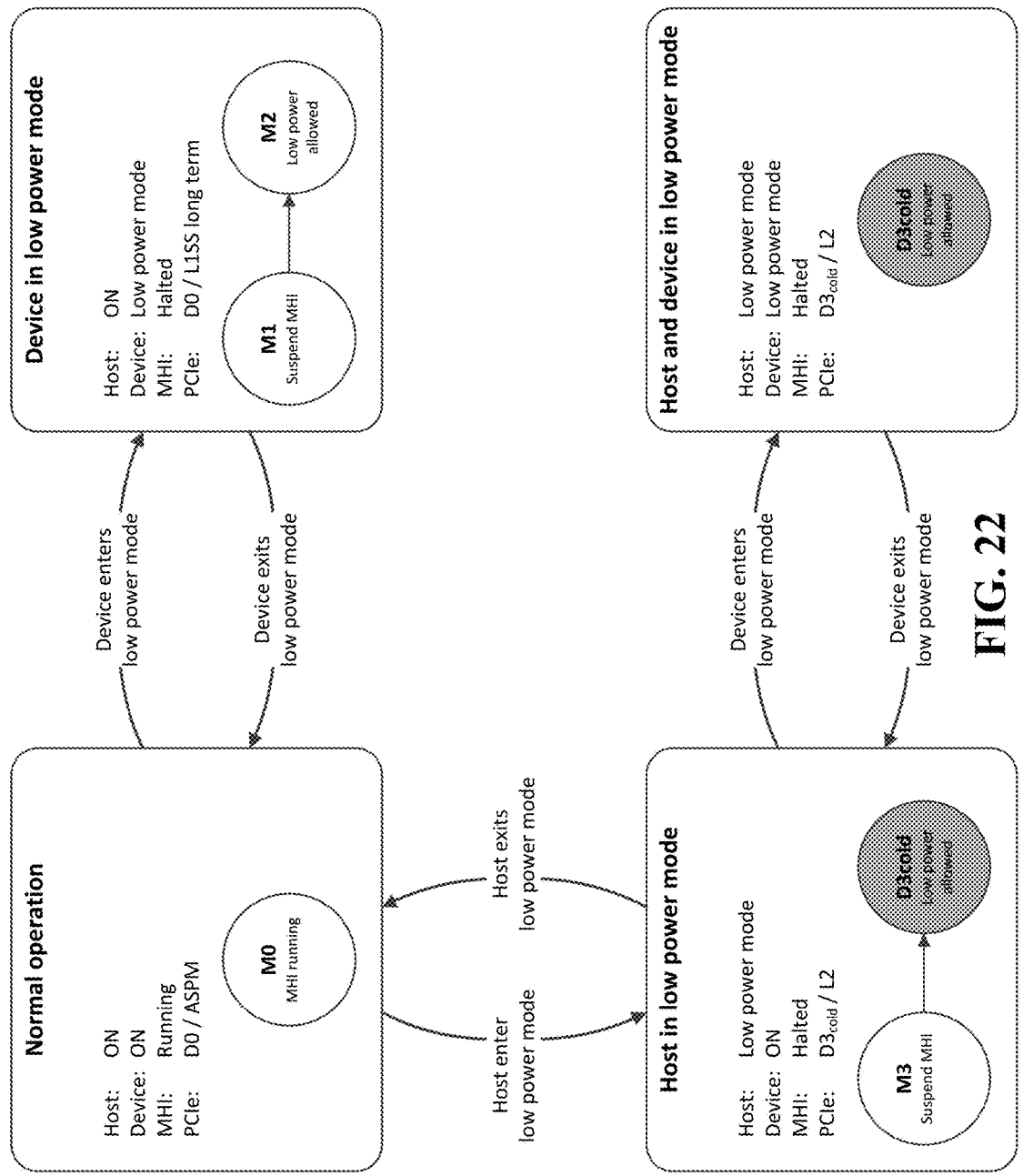
FIG. 22 is a diagram depicting states of power reporting and management.

FIG. 22 is a diagram depicting states of power reporting and management.

One or more of the components, steps, features, and/or functions illustrated in the Figures may be rearranged and/or combined into a single component, step, feature or function or embodied in several components, steps, or functions. Additional elements, components, steps, and/or functions may also be added without departing from the invention.

One or more of the components, steps, features and/or functions illustrated in the Figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. The term "die package" is used to refer to an integrated circuit wafer that has been encapsulated or packaged or encapsulated.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for communicating, via a memory-mapped communication path, between a host processor and a cellular-communication modem, the method comprising:

providing logical channels over the memory-mapped communication path;
transporting data organized according to one or more cellular communication protocols over at least one of the logical channels;
acknowledging when data transfer occurs between the host processor and the cellular-communication modem;
issuing commands between the host processor and the cellular-communication modem;
communicating and managing a power state via one or more of the logical channels;
allocating direct memory access data buffers in a memory of the host processor;
storing a boot image for the cellular-communication modem in the direct memory access data buffers;
storing a listing of locations of the direct memory access buffers;
communicating an address of the listing to the cellular-communication modem;
pulling the boot image from the direct memory access data buffers to the cellular-communication modem; and
executing the boot image at the cellular-communication modem.

2. The method 1, wherein acknowledging includes utilizing peripheral component interconnect express (PCIe) interrupts to acknowledge the completion of data, messages, and commands.

3. The method of claim 1, including:
initiating cellular-communication-modem-controlled scatter-gather data transfers via one or more of the logical channels.

4. The method of claim 1 including:
pushing random access memory dumps from the cellular-communication modem to the host processor.

5. The method of claim 1, including:
allocating direct memory access data buffers in a memory of the host processor;
storing cellular protocol messages for the cellular-communication modem in the direct memory access data buffers;
storing a listing of locations of the direct memory access buffers;
communicating an address of the listing to the cellular-communication modem;
pulling the cellular protocol messages from the direct memory access data buffers to the cellular-communication modem; and
processing the cellular protocol messages at the cellular-communication modem.

6. A computing apparatus comprising:
a host processor;
a cellular communication modem;
a memory-mapped communication path disposed between the host processor and the cellular-communication modem;
means for providing logical channels over the memory-mapped communication path;
means for transporting data organized according to one or more cellular communication protocols over at least one of the logical channels;
means for acknowledging when data transfer occurs between the host processor and the cellular-communication modem;
means for issuing commands between the host processor and the cellular-communication modem;
means for communicating and managing a power state via one or more of the logical channels;
means for allocating direct memory access data buffers in a memory of the host processor;
means for storing a boot image for the cellular-communication modem in the direct memory access data buffers;
means for storing a listing of locations of the direct memory access buffers;
means for communicating an address of the listing to the cellular-communication modem;
means for pulling the boot image from the direct memory access data buffers to the cellular-communication modem; and
means for executing the boot image at the cellular-communication modem.

7. The computing apparatus 6, wherein means for acknowledging includes means for utilizing peripheral component interconnect express (PCIe) interrupts to acknowledge the completion of data, messages, and commands.

8. The computing apparatus of claim 6, including:
means for initiating cellular-communication-modem-controlled scatter-gather data transfers via one or more of the logical channels.

9. The computing apparatus of claim 6 including:
means for pushing random access memory dumps from the cellular-communication modem to the host processor.

10. The computing apparatus of claim 6, including:
means for allocating direct memory access data buffers in a memory of the host processor;
means for storing cellular protocol messages for the cellular-communication modem in the direct memory access data buffers;
means for storing a listing of locations of the direct memory access buffers;
communicating an address of the listing to the cellular-communication modem;
means for pulling the cellular protocol messages from the direct memory access data buffers to the cellular-communication modem; and
means for processing the cellular protocol messages at the cellular-communication modem.

11. The computing apparatus of claim 10, wherein means for communicating the address of the listing includes means for mapping configuration registers into an address space of the host processor.

12. A non-transitory, tangible processor readable storage medium, encoded with processor readable instructions to perform a method for communicating, via a memory-mapped communication path, between a host processor and a cellular-communication modem, the method comprising:
providing logical channels over the memory-mapped communication path;
transporting data organized according to one or more cellular communication protocols over at least one of the logical channels;
acknowledging when data transfer occurs between the host processor and the cellular-communication modem;
issuing commands between the host processor and the cellular-communication modem;
communicating and managing a power state via one or more of the logical channels;
allocating direct memory access data buffers in a memory of the host processor;
storing cellular protocol messages for the cellular-communication modem in the direct memory access data buffers;

storing a listing of locations of the direct memory access buffers;

communicating an address of the listing to the cellular-communication modem;

pulling the cellular protocol messages from the direct memory access data buffers to the cellular-communication modem; and processing the cellular protocol messages at the cellular-communication modem.

13. The non-transitory, tangible processor readable storage medium of claim 12, wherein acknowledging includes utilizing peripheral component interconnect express (PCIe) interrupts to acknowledge the completion of data, messages, and commands.

14. The non-transitory, tangible processor readable storage medium of claim 12, the method including:

initiating cellular-communication-modem-controlled scatter-gather data transfers via one or more of the logical channels.

15. The non-transitory, tangible processor readable storage medium of claim 12, the method including:

allocating direct memory access data buffers in a memory of the host processor;

storing a boot image for the cellular-communication modem in the direct memory access data buffers;

storing a listing of locations of the direct memory access buffers;

communicating an address of the listing to the cellular-communication modem;

pulling the boot image from the direct memory access data buffers to the cellular-communication modem; and executing the boot image at the cellular-communication modem.

16. The non-transitory, tangible processor readable storage medium of claim 15 the method including:

pushing random access memory dumps from the cellular-communication modem to the host processor.

17. The non-transitory, tangible processor readable storage medium of claim 12, wherein communicating the address of the listing includes mapping configuration registers into an address space of the host processor.

* * * * *